United States Patent
Eldering et al.

(10) Patent No.: US 8,484,677 B1
(45) Date of Patent: *Jul. 9, 2013

(54) ADVERTISEMENT MONITORING SYSTEM

(75) Inventors: Charles A. Eldering, Doylestown, PA (US); M. Lamine Sylla, New Britain, PA (US)

(73) Assignee: Prime Research Alliance E., Inc. (VG)

( * ) Notice: Subject to any disclaimer, the term of this patent is extended or adjusted under 35 U.S.C. 154(b) by 113 days.

This patent is subject to a terminal disclaimer.

(21) Appl. No.: 13/156,442

(22) Filed: Jun. 9, 2011

Related U.S. Application Data

(63) Continuation of application No. 12/700,231, filed on Feb. 4, 2010, now Pat. No. 7,962,934, which is a continuation of application No. 11/672,371, filed on Feb. 7, 2007, now Pat. No. 7,690,013, which is a continuation of application No. 09/205,119, filed on Dec. 3, 1998, now abandoned.

(51) Int. Cl.
*H04N 7/10* (2006.01)
*H04N 7/025* (2006.01)

(52) U.S. Cl.
USPC .................... 725/35; 725/20; 725/34; 725/36

(58) Field of Classification Search
USPC ............................................... 725/20, 34–36
See application file for complete search history.

(56) References Cited

U.S. PATENT DOCUMENTS

| 4,258,386 A | 3/1981 | Cheung |
| 4,546,382 A | 10/1985 | McKenna |
| 4,573,072 A | 2/1986 | Freeman |
| 4,602,279 A | 7/1986 | Freeman |
| 4,646,145 A | 2/1987 | Percy et al. |
| 4,745,549 A | 5/1988 | Hashimoto |
| 4,754,410 A | 6/1988 | Leech |
| 4,833,308 A | 5/1989 | Humble |
| 4,930,011 A | 5/1990 | Klewit |
| 4,972,504 A | 11/1990 | Daniel, Jr. |
| 5,099,319 A | 3/1992 | Esch |

(Continued)

FOREIGN PATENT DOCUMENTS

| CA | 2286243 | 4/2001 |
| CA | 2323166 | 4/2001 |

(Continued)

OTHER PUBLICATIONS

Product Literature,. "Accipiter AdManager 2.0" Accipiter Inc. 5 pgs.

(Continued)

*Primary Examiner* — Hunter B Lonsberry
(74) *Attorney, Agent, or Firm* — The Belles Group, P.C.

(57) ABSTRACT

An advertising monitoring system is presented in which subscriber selections including channel changes are monitored, and in which information regarding an advertisement is extracted from text related to the advertisement. The text related to the advertisement is in the form of closed caption text, data transmitted with the advertisement, or other associated text. A record of the effectiveness of the advertisement is created in which measurements of the percentage of the advertisement which was viewed are stored. Such records allow a manufacturer or advertiser to determine if their advertisement is being watched by subscribers. The system can be realized in a client-sever mode in which subscriber selection requests are transmitted to a server for fulfillment, in which case the advertisement monitoring takes place at the server side.

20 Claims, 22 Drawing Sheets

U.S. PATENT DOCUMENTS

| | | | |
|---|---|---|---|
| 5,128,752 A | 7/1992 | Von Kohorn | |
| 5,155,591 A | 10/1992 | Wachob | |
| 5,201,010 A | 4/1993 | Deaton | |
| 5,223,924 A | 6/1993 | Strubbe | |
| 5,227,874 A | 7/1993 | Von Kohorn | |
| 5,231,494 A | 7/1993 | Wachob | |
| 5,233,423 A | 8/1993 | Jernigan | |
| 5,237,620 A | 8/1993 | Deaton | |
| 5,251,324 A | 10/1993 | McMullan, Jr. | |
| 5,285,278 A | 2/1994 | Holman | |
| 5,287,181 A | 2/1994 | Holman | |
| 5,305,196 A | 4/1994 | Deaton et al. | |
| 5,315,093 A | 5/1994 | Stewart | |
| 5,319,455 A | 6/1994 | Hoarty | |
| 5,327,508 A | 7/1994 | Deaton | |
| 5,351,075 A | 9/1994 | Herz | |
| 5,374,951 A | 12/1994 | Welsh | |
| 5,388,165 A | 2/1995 | Deaton et al. | |
| 5,410,344 A | 4/1995 | Graves | |
| 5,430,644 A | 7/1995 | Deaton et al. | |
| 5,446,919 A | 8/1995 | Wilkins | |
| 5,448,471 A | 9/1995 | Deaton et al. | |
| 5,488,409 A * | 1/1996 | Yuen et al. | 725/41 |
| 5,515,098 A | 5/1996 | Carles | |
| 5,550,928 A | 8/1996 | Lu | |
| 5,559,549 A | 9/1996 | Hendricks | |
| 5,565,909 A | 10/1996 | Thibadeau | |
| 5,579,055 A | 11/1996 | Hamilton | |
| 5,585,865 A | 12/1996 | Amano | |
| 5,592,560 A | 1/1997 | Deaton | |
| 5,596,373 A | 1/1997 | White | |
| 5,600,364 A | 2/1997 | Hendricks | |
| 5,604,542 A | 2/1997 | Dedrick | |
| 5,608,445 A | 3/1997 | Mischler | |
| 5,619,709 A | 4/1997 | Caid | |
| 5,621,812 A | 4/1997 | Deaton et al. | |
| 5,632,007 A | 5/1997 | Freeman | |
| 5,635,989 A | 6/1997 | Rothmuller | |
| 5,636,346 A | 6/1997 | Saxe | |
| 5,638,457 A | 6/1997 | Deaton | |
| 5,642,485 A | 6/1997 | Deaton et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,661,516 A | 8/1997 | Carles | |
| 5,675,662 A | 10/1997 | Deaton et al. | |
| 5,682,195 A | 10/1997 | Hendricks | |
| 5,687,322 A | 11/1997 | Deaton et al. | |
| 5,703,655 A | 12/1997 | Corey et al. | |
| 5,704,017 A | 12/1997 | Heckerman | |
| 5,710,884 A | 1/1998 | Dedrick | |
| 5,724,521 A | 3/1998 | Dedrick | |
| 5,740,549 A | 4/1998 | Reilly | |
| 5,749,081 A | 5/1998 | Whiteis | |
| 5,754,938 A | 5/1998 | Herz | |
| 5,754,939 A | 5/1998 | Herz et al. | |
| 5,758,257 A | 5/1998 | Herz | |
| 5,758,259 A | 5/1998 | Lawler | |
| 5,761,601 A | 6/1998 | Nemirofsky | |
| 5,761,662 A | 6/1998 | Dasan | |
| 5,765,030 A | 6/1998 | Nachenberg et al. | |
| 5,768,592 A | 6/1998 | Chang | |
| 5,774,170 A | 6/1998 | Hite | |
| 5,774,664 A | 6/1998 | Hidary | |
| 5,774,868 A | 6/1998 | Cragun et al. | |
| 5,786,845 A | 7/1998 | Tsuria | |
| 5,790,935 A | 8/1998 | Payton | |
| 5,794,210 A | 8/1998 | Goldhaber et al. | |
| 5,796,952 A | 8/1998 | Davis | |
| 5,801,747 A | 9/1998 | Bedard | |
| 5,805,974 A | 9/1998 | Hite | |
| 5,818,935 A | 10/1998 | Maa | |
| 5,819,156 A | 10/1998 | Belmont | |
| 5,832,457 A | 11/1998 | O'Brien et al. | |
| 5,835,087 A | 11/1998 | Herz et al. | |
| 5,835,905 A | 11/1998 | Pirolli | |
| 5,848,396 A | 12/1998 | Gerace | |
| 5,857,190 A | 1/1999 | Brown | |
| 5,872,588 A | 2/1999 | Aras | |
| 5,877,812 A | 3/1999 | Krause | |
| 5,883,818 A | 3/1999 | Salimi et al. | |
| 5,912,696 A | 6/1999 | Bueh | |
| 5,915,243 A | 6/1999 | Smolen | |
| 5,918,014 A | 6/1999 | Robinson | |
| 5,926,205 A | 7/1999 | Krause | |
| 5,930,764 A | 7/1999 | Melchione et al. | |
| 5,933,811 A | 8/1999 | Angles | |
| 5,948,061 A | 9/1999 | Merriman | |
| 5,956,637 A | 9/1999 | Ericsson | |
| 5,970,469 A | 10/1999 | Scroggie et al. | |
| 5,974,299 A | 10/1999 | Massetti | |
| 5,974,396 A | 10/1999 | Anderson | |
| 5,974,398 A | 10/1999 | Hanson | |
| 5,974,399 A | 10/1999 | Giulian | |
| 5,977,964 A | 11/1999 | Williams | |
| 5,978,799 A | 11/1999 | Hirsch | |
| 5,991,735 A | 11/1999 | Gerace | |
| 6,002,393 A | 12/1999 | Hite et al. | |
| 6,002,394 A | 12/1999 | Schein | |
| 6,005,561 A | 12/1999 | Hawkins | |
| 6,005,597 A | 12/1999 | Barrett | |
| 6,006,257 A | 12/1999 | Slezak | |
| 6,009,409 A | 12/1999 | Adler | |
| 6,009,410 A | 12/1999 | LeMole | |
| 6,012,051 A | 1/2000 | Sammon, Jr. | |
| 6,014,634 A | 1/2000 | Scroggie et al. | |
| 6,014,698 A | 1/2000 | Griffiths | |
| 6,018,710 A | 1/2000 | Wynblatt | |
| 6,020,883 A | 2/2000 | Herz | |
| 6,026,368 A | 2/2000 | Brown | |
| 6,026,369 A | 2/2000 | Capek | |
| 6,026,370 A | 2/2000 | Jermyn | |
| 6,029,195 A | 2/2000 | Herz | |
| 6,032,131 A | 2/2000 | Vogel | |
| 6,035,280 A | 3/2000 | Christensen | |
| 6,038,591 A | 3/2000 | Wolfe et al. | |
| 6,055,510 A | 4/2000 | Henrick | |
| 6,055,573 A | 4/2000 | Gardenswartz et al. | |
| 6,057,872 A | 5/2000 | Candelore | |
| 6,084,628 A | 7/2000 | Sawyer | |
| 6,085,031 A | 7/2000 | Johnson et al. | |
| 6,088,722 A | 7/2000 | Herz | |
| 6,108,637 A | 8/2000 | Blumenau | |
| 6,119,098 A | 9/2000 | Guyot | |
| 6,119,101 A | 9/2000 | Peckover | |
| 6,133,912 A | 10/2000 | Montero | |
| 6,134,532 A | 10/2000 | Lazarus | |
| 6,141,010 A | 10/2000 | Hoyle | |
| 6,160,570 A | 12/2000 | Sitnik | |
| 6,160,989 A | 12/2000 | Hendricks | |
| 6,177,931 B1 * | 1/2001 | Alexander et al. | 725/52 |
| 6,185,541 B1 | 2/2001 | Scroggie et al. | |
| 6,205,247 B1 | 3/2001 | Breuer et al. | |
| 6,216,129 B1 | 4/2001 | Eldering | |
| 6,236,978 B1 | 5/2001 | Tuzhilin | |
| 6,237,022 B1 | 5/2001 | Bruck | |
| 6,266,649 B1 | 7/2001 | Linden | |
| 6,285,987 B1 | 9/2001 | Roth | |
| 6,286,005 B1 | 9/2001 | Cannon | |
| 6,286,140 B1 | 9/2001 | Ivanyi | |
| 6,298,348 B1 | 10/2001 | Eldering | |
| 6,324,519 B1 | 11/2001 | Eldering | |
| 6,327,574 B1 | 12/2001 | Kramer | |
| 6,400,996 B1 | 6/2002 | Hoffberg et al. | |
| 6,415,322 B1 | 7/2002 | Jaye | |
| 6,446,261 B1 | 9/2002 | Rosser | |
| 6,457,010 B1 | 9/2002 | Eldering | |
| 6,460,036 B1 | 10/2002 | Herz | |
| 6,463,585 B1 | 10/2002 | Hendricks | |
| 6,560,578 B2 | 5/2003 | Eldering | |
| 6,614,987 B1 | 9/2003 | Ismail | |
| 6,637,029 B1 | 10/2003 | Maissel et al. | |
| 6,684,194 B1 | 1/2004 | Eldering | |
| 6,698,020 B1 | 2/2004 | Zigmond | |
| 6,714,917 B1 | 3/2004 | Eldering | |
| 6,738,978 B1 | 5/2004 | Hendricks et al. | |
| 6,820,062 B1 | 11/2004 | Gupta et al. | |

| | | | |
|---|---|---|---|
| 7,003,792 | B1 | 2/2006 | Yuen |
| 7,062,510 | B1 | 6/2006 | Eldering |
| 7,150,030 | B1 | 12/2006 | Eldering |
| 7,240,355 | B1 | 7/2007 | Eldering |
| 7,370,342 | B2 * | 5/2008 | Ismail et al. .......... 725/46 |
| 2001/0049620 | A1 | 12/2001 | Blasko |
| 2002/0082923 | A1 | 6/2002 | Merriman |
| 2002/0095676 | A1 | 7/2002 | Knee |
| 2002/0194058 | A1 | 12/2002 | Eldering |
| 2003/0004810 | A1 | 1/2003 | Eldering |
| 2003/0088872 | A1 | 5/2003 | Maissel et al. |
| 2003/0135853 | A1 | 7/2003 | Goldman |
| 2005/0283796 | A1 | 12/2005 | Flickinger |

FOREIGN PATENT DOCUMENTS

| | | |
|---|---|---|
| GB | 2348346 | 9/2000 |
| GB | 2348530 | 10/2000 |
| WO | WO9423383 A1 | 10/1994 |
| WO | WO9712486 A1 | 4/1997 |
| WO | WO9717774 A1 | 5/1997 |
| WO | WO9726612 A1 | 7/1997 |
| WO | WO9741673 A2 | 11/1997 |
| WO | WO9821713 A1 | 5/1998 |
| WO | WO9821877 A2 | 5/1998 |
| WO | WO9828906 A2 | 7/1998 |
| WO | WO9834189 A1 | 8/1998 |
| WO | WO9901984 A1 | 1/1999 |
| WO | WO9904561 A1 | 1/1999 |
| WO | WO9944159 A1 | 9/1999 |
| WO | WO9952285 A1 | 10/1999 |
| WO | WO9960789 A1 | 11/1999 |
| WO | WO9965237 A1 | 12/1999 |
| WO | WO9966719 A1 | 12/1999 |
| WO | WO0003160 A1 | 1/2000 |
| WO | WO0008802 A2 | 2/2000 |
| WO | WO0013434 A2 | 3/2000 |
| WO | WO0014951 A1 | 3/2000 |
| WO | WO0022818 A1 | 4/2000 |
| WO | WO0033224 A1 | 6/2000 |
| WO | WO0049801 A1 | 6/2000 |
| WO | WO0054504 A1 | 9/2000 |
| WO | WO0055748 A1 | 9/2000 |
| WO | WO0124027 A1 | 4/2001 |
| WO | WO0165453 A2 | 9/2001 |

OTHER PUBLICATIONS

Web Pages, "AdForce introduces AdForce Everywhere: Advertising, Marketing and Promotions Wherever a Digital Signal can be sent", Aforce, Mar. 27, 2000, 3 pgs.

Web Pages, "The AdForce professional management team, composed of seasoned high technology and Internet executives, is unique in the field of Internet advertising management.", AdForce, 4 pgs. Mar. 24, 2000.

Web Pages, AdForce Strategic Partners, AdForce, 2 pgs., Mar. 27, 2000.

Web pages, Ad Force, IMGIS Inc. Jun. 30, 1998, 5 pgs.

Amsbury, Wayne, "Data Structures From Arrays to Priority Queues", Wadsworth Publishing Company, pp. 288, 332, 333, 4 pgs., 1985.

Armstrong, Larry, "Coupon Clippers, Save Your Scissors", Business Week, Jun. 20, 1994, pp. cover, table of contents, 164, 166.

Marketing Literature, "The Power of Personalization", Broadvision, 3 pgs.

Product Literature "DoubleClick Debuts New Tool for Testing Creative on the Web", May 1996, PRNewswire, (2pp.).

Product Literature, DoubleClick Inc., "DoubleClick: Reporting."

Product Literature, "Engage.Discover", Engage Technologies, 2 pgs.

Web Pages, Firefly Passport Office Overview, www.firefly.net, Jun. 20, 1998, 8 pgs.

Gallagher, K and Parsons, J., "A Framework for Targeting Banner Advertisements on the Internet", Jan. 1997, pp. 265-274 vol. 4, IEEE Publication, Proceedings of the 30th Hawaii Int'l Conference (12pp. ).

Chang, A.M., ""Goodies" in exchange for consumer information on the internet: economics and issues", IEEE Publication, 12 pgs., Jan. 1998.

Web pages, Matchlogic, Inc. , Services, www. Matchlogic.com, Jul. 1, 1998, 2 pgs.

Web Pages, MediaMetrix Frequently Asked Questions, www.mediametrix.com, Jun. 30, 1998, 2 pgs.

White Papers, Netperceptions, www.netperceptions.com, Jun. 30, 1998, 11 pgs.

Product Literature, "AdServer 3", Netgravity Inc. 6 pgs.

"The Active/Passive Digital Meter System" Apr. 1997, Nielsen Media Research (2pp.).

Nielson Media Research "Success Through Innovation" Sep. 19997, Nielsen Media Research (5pp.).

Web pages, Open Sesame Product Data Sheet, www.opensesame.com, Jul. 7, 1998, 3 pgs.

Raskutti, et al., "Acquiring Customer Preferences for Information Filtering: a Heuristic-Statistical Approach", Proceedings of the 5th Int'l Conference on User Modeling, Kaluna-Kona, HI, USA, Jan. 2-5, 1996.

Rossi, McCulloch, Allenby, "The Value of Purchase History Data in Target Marketing", Marketing Science; vol. 15, No. 4, 1996, 20 pgs.

Web Pages, "SelectCast for Commerce Servers", Aptex Sofware, Inc. Jun. 30, 1998, 2 pgs.

Web Pages, "SelectCast for Ad Servers", Aptex Software, Inc., Jun. 30, 1998, 2 pgs.

U.S. Appl. No. 09/205,119, filed Dec. 3, 1998, Eldering, Charles A.
U.S. Appl. No. 09/516,314, filed Mar. 1, 2000, Eldering, Charles A.
U.S. Appl. No. 09/516,983, Eldering, Charles A.
U.S. Appl. No. 09/591,577, filed Jun. 9, 2000, Eldering, Charles A.
U.S. Appl. No. 09/635,252, filed Aug. 9, 2000, Eldering, Charles A.
U.S. Appl. No. 09/635,542, filed Aug. 10, 2000, Eldering, Charles A.
U.S. Appl. No. 09/857,160, filed Jul. 1, 2001, Eldering, Charles A.
U.S. Appl. No. 09/857,256, filed Jun. 1, 2001, Eldering, Charles A.

* cited by examiner

| TIME | CHANNEL ID | PROGRAM TITLE | VOLUME |
|---|---|---|---|
| 08:01:25AM | 06 | "MORNING TV" | 5/10 |
| 08:01:45AM | 13 | "GOOD MORNING AMERICA" | 5/10 |
| 08:03:25AM | 13 | "GOOD MORNING AMERICA" | 6/10 |
| ... | | | |
| 06:11:25PM | 09 | "SEINFELD" | 5/10 |
| 06:15:23PM | 09 | "ADVERTISING" | 5/10 |
| 06:17:25PM | 09 | "SEINFELD" | 5/10 |
| 06:28:10PM | 09 | "ADVERTISING" | 5/10 |
| 06:30:07PM | 52 | "LIVING SINGLE" | 5/10 |
| ... | | | |

| TIME OF DAY | MINUTES WATCHED | CHANNEL CHANGES | AVERAGE VOLUME |
|---|---|---|---|
| MORNING (6AM-9AM) | 61 | 2 | 5/10 |
| MID-DAY (9AM-3PM) | 0 | 0 | - |
| AFTERNOON (3PM-6PM) | 0 | 0 | - |
| NIGHT (6PM-10PM) | 122 | 4 | 6/10 |
| LATE NIGHT (12AM-6AM) | 0 | 0 | - |
| TOTAL | 183 | 6 | 5.7/10 |

FIG. 7

| CATEGORIES | DEMOGRAPHIC GROUPS | | | | | | | | | | |
|---|---|---|---|---|---|---|---|---|---|---|---|
| | AGE | | | INCOME | | | SIZE | | | GENDER | |
| | 0-10 | 10-18 ... | >70 | 0-20K | 20-50K ... | 50-100K | 1 | 2 ... | >5 | M | F |
| NEWS | 0.1 | 0.1 | 0.4 | 0.2 | 0.3 | 0.4 | 0.5 | 0.3 | 0.1 | 0.3 | 0.7 |
| FICTION | 0.5 | 0.3 | 0.2 | 0.4 | 0.2 | 0.3 | 0.3 | 0.2 | 0.1 | 0.8 | 0.2 |
| FACTUAL | 0.2 | 0.2 | 0.3 | 0.1 | 0.4 | 0.2 | 0.2 | 0.2 | 0.4 | 0.4 | 0.6 |
| ... | | | | | | | | | | | |
| ADVERTISING | 0.1 | 0.3 | 0.5 | 0.3 | 0.2 | 0.1 | 0.2 | 0.1 | 0.3 | 0.5 | 0.5 |

*FIG. 10B*

| HOUSEHOLD PARAMETER | AVERAGE VALUE | SESSION VALUE | UPDATE? |
|---|---|---|---|
| SIZE | 2.6 | 3.0 | YES |
| AGE | 23.5 | 12 | YES |
| SEX (FEMALE=1) | 0.6 | 0.7 | YES |
| INCOME ($0-$20K) | 0.1 | 0.1 | YES |
| INCOME ($20-$50K) | 0.6 | 0.7 | YES |
| INCOME ($50-$100K) | 0.2 | 0.1 | YES |
| INCOME (>$100K) | 0.1 | 0.1 | YES |
| ZIP CODE | | | NO |
| TELEPHONE NUMBER | | | NO |

*FIG. 15*

|  | HOUSEHOLD INTEREST | AVERAGE VALUE | SESSION VALUE |
|---|---|---|---|
| PROGRAMMING | DRAMA | 0.1 | 0.20 |
| | ROMANCE | 0.1 | 0.20 |
| | ACTION | 0.6 | 0.25 |
| | SITCOM | 0.2 | 0.30 |
| | ⋮ | | |
| | SPORTS | 0 | 0.05 |
| PRODUCTS | HEALTH/EXCERCISE | 0.6 | 0.2 |
| | FOOD | 0.3 | 0.4 |
| | CHILD RELATED | 0.0 | 0.1 |
| | TOYS | 0.0 | 0.1 |
| | ⋮ | | |
| | AUTOMOBILE | 0.1 | 0.2 |

*FIG. 17*

| ADID | PRODUCT | BRAND | % WATCHED | VOLUME |
|---|---|---|---|---|
| 216 | DIAPERS | HUGS | 50% | 6/10 |
| 1230 | DETERGENT | SOAPY | 90% | 6/10 |
| ... | | | | |
| 4137 | AUTOMOBILES | SPEEDSTER | 70% | 8/10 |

Column labels: 1915, 1921, 1927, 1933, 1937

*FIG. 19*

ADVERTISEMENT MONITORING SYSTEM

CROSS REFERENCE TO RELATED APPLICATION

This application is a continuation of U.S. patent application Ser. No. 12/700,231, filed Feb. 4, 2010, now U.S. Pat. No. 7,962,934 and entitled Advertisement Monitoring System, which is a continuation of U.S. patent application Ser. No. 11/672,371 (now U.S. Pat. No. 7,690,013), filed Feb. 7, 2007, and entitled Advertisement Monitoring System, which is a continuation of U.S. patent application Ser. No. 09/205,119 (now abandoned), filed Dec. 3, 1998, and entitled Advertisement Monitoring System, the entire disclosures of which are incorporated herein by reference.

BACKGROUND OF THE INVENTION

Advertisements are a part of daily life and certainly an important part of entertainment programming, where the payments for advertisements cover the cost of network television. Manufacturers pay an extremely high price to present, in 30 seconds or less, an advertisement for their product which they hope a consumer will watch. Unfortunately for the manufacturer, the consumer frequently uses that interval of time to check the programming being presented on the other channels, and may not watch any of the advertisement. Alternately, the consumer may mute the channel and ignore what the manufacturer has presented. In any case the probability that the consumer has watched the advertisement is quite low. It is not until millions of dollars have been spent on an advertising campaign that a manufacturer can determine that the ads have been effective. This is presently accomplished by monitoring sales of the product.

With the advent of the Internet manufacturers and service providers have found ways to selectively insert their advertisements based on a subscriber's requests for information. As an example, an individual who searches for "cars" on the Internet may see an advertisement for a particular type of car. Nevertheless, unless the subscriber actually goes to the advertised web site, there is no way to determine if the advertisement has been watched. As the content on the Internet migrates to multimedia programming including audio and video, the costs for the advertising will increase, but unless the advertiser can be sure that a significant percentage of the message was watched or observed, the advertising is ineffective.

Cable television service providers have typically provided one-way broadcast services but now offer high-speed data services and can combine traditional analog broadcasts with digital broadcasts and access to Internet web sites. Telephone companies can offer digital data and video programming on a switched basis over digital subscriber line technology. Although the subscriber may only be presented with one channel at a time, channel change requests are instantaneously transmitted to centralized switching equipment and the subscriber can access the programming in a broadcast-like manner. Internet Service Providers (ISPs) offer Internet access and can offer access to text, audio, and video programming which can also be delivered in a broadcast-like manner in which the subscriber selects "channels" containing programming of interest. Such channels may be offered as part of a video programming service or within a data service and can be presented within an Internet browser.

For the foregoing reasons, there is a need for an advertisement monitoring system which can monitor which advertisements have been viewed by a subscriber.

SUMMARY OF THE INVENTION

The present invention encompasses a system for determining to what extent an advertisement has been viewed by a subscriber or household.

In a preferred embodiment subscriber selection data including the channel selected and the time at which is was selected are recorded. Advertisement related information including the type of product, brand name, and other descriptive information which categorizes the advertisement is extracted from the advertisement or text information related to the advertisement including closed captioning text. Based on the subscriber selection data a record of what percentage of the advertisement was watched is created. This record can subsequently be used to make a measure of the effectiveness of the advertisement.

In a preferred embodiment the text information related to the advertisement is processed using context mining techniques which allow for classification of the advertisement and extraction of key data including product type and brand. Context mining techniques allow for determination of a product type, product brand name and in the case of a product which is not sold with a particular brand name, a generic name for the product.

The present invention can also be realized in a client-server mode in which case the subscriber executes channel changes at the client side of the network which are transmitted to the server side and fulfilled by the routing of a channel to the subscriber. The server side monitors the subscriber activity and stores the record of channel change requests. Advertisement related information is retrieved from the server side, which contains the advertising material itself, retrieves the advertising material from a third party, or analyzes the data stream carrying the advertising to the subscriber. The server side extracts descriptive fields from the advertisement and based on the subscriber selection data, determines the extent to which the advertisement was viewed by the subscriber. As an example the system can determine the percentage of the advertisement that was viewed by the subscriber.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6 illustrates a time of day detailed record;

FIG. 7 illustrates a household viewing habits statistical table;

FIG. 10B illustrates a set of heuristic rules expressed in terms of conditional probabilities;

FIG. 15 illustrates average and session household demographic data;

FIG. 17 illustrates household interest profile including programming and product profiles;

FIG. 19 illustrates an advertisement monitoring table.

DETAILED DESCRIPTION OF THE PREFERRED EMBODIMENT

Figure 1:
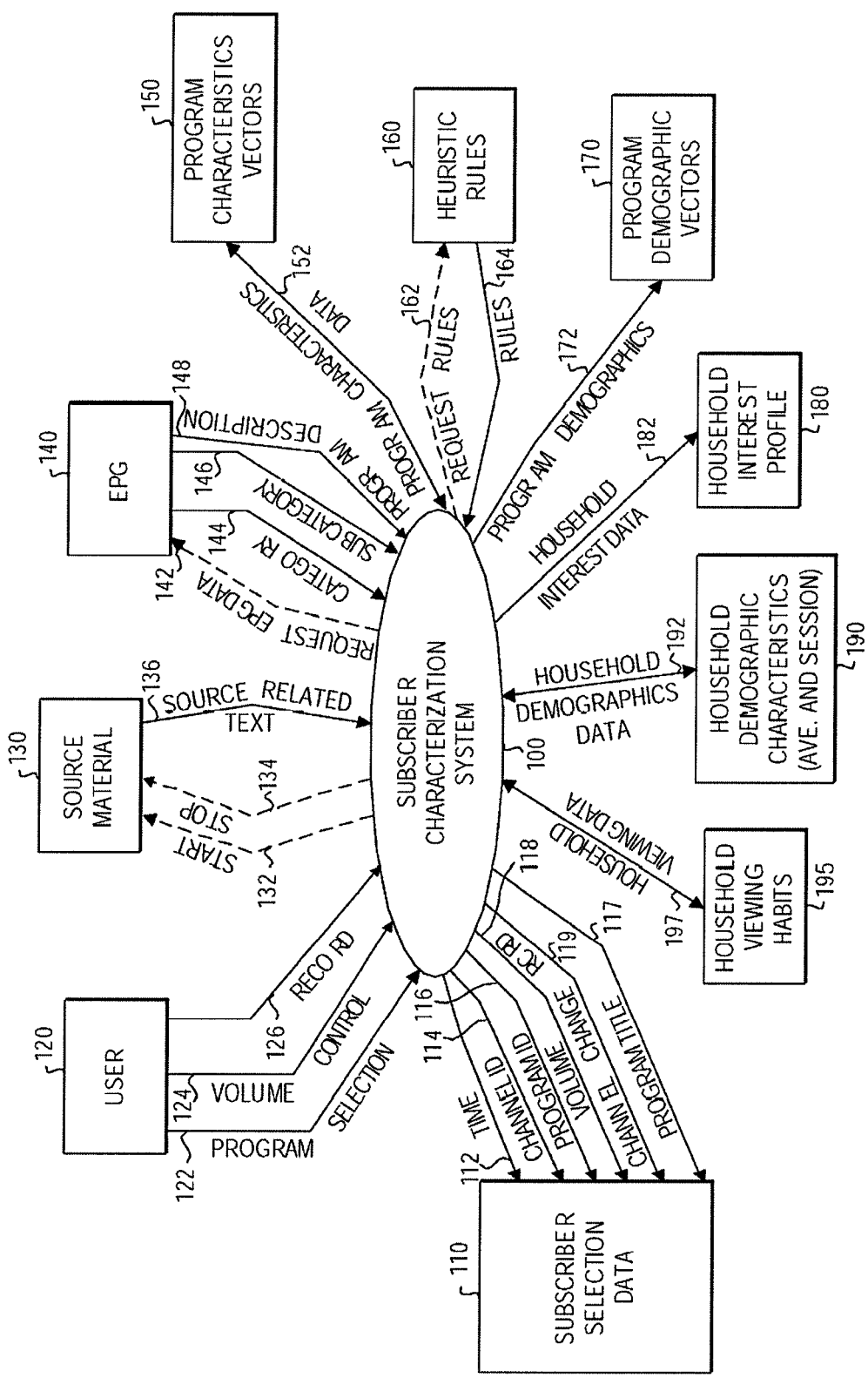
FIG. 1 shows a context diagram for a subscriber characterization system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 19 in particular, the apparatus of the present invention is disclosed.

The present invention is directed at an apparatus for monitoring which advertisements are watched by a subscriber or a household.

In the present system the programming viewed by the subscriber, both entertainment and advertisement, can be studied and processed by the subscriber characterization system to determine the program characteristics. This determination of the program characteristics is referred to as a program characteristics vector. The vector may be a truly one-dimensional vector, but can also be represented as an n dimensional matrix which can be decomposed into vectors. For advertisements, the program characteristics vector can contain information regarding the advertisement including product type, features, brand or generic name, or other relevant advertising information.

The subscriber profile vector represents a profile of the subscriber (or the household of subscribers) and can be in the form of a demographic profile (average or session) or a program or product preference vector. The program and product preference vectors are considered to be part of a household interest profile which can be thought of as an n dimensional matrix representing probabilistic measurements of subscriber interests.

In the case that the subscriber profile vector is a demographic profile, the subscriber profile vector indicates a probabilistic measure of the age of the subscriber or average age of the viewers in the household, sex of the subscriber, income range of the subscriber or household, and other such demographic data. Such information comprises household demographic characteristics and is composed of both average and session values. Extracting a single set of values from the household demographic characteristics can correspond to a subscriber profile vector.

The household interest profile can contain both programming and product profiles, with programming profiles corresponding to probabilistic determinations of what programming the subscriber (household) is likely to be interested in, and product profiles corresponding to what products the subscriber (household) is likely to be interested in. These profiles contain both an average value and a session value, the average value being a time average of data, where the averaging period may be several days, weeks, months, or the time between resets of unit.

Since a viewing session is likely to be dominated by a particular viewer, the session values may, in some circumstances, correspond most closely to the subscriber values, while the average values may, in some circumstances, correspond most closely to the household values.

FIG. 1 depicts the context diagram of a preferred embodiment of a Subscriber Characterization System (SCS) 100. A context diagram, in combination with entity-relationship diagrams, provide a basis from which one skilled in the art can realize the present invention. The present invention can be realized in a number of programming languages including C, C++, Perl, and Java, although the scope of the invention is not limited by the choice of a particular programming language or tool. Object oriented languages have several advantages in terms of construction of the software used to realize the present invention, although the present invention can be realized in procedural or other types of programming languages known to those skilled in the art.

In generating a subscriber profile, the SCS 100 receives from a user 120 commands in the form of a volume control signal 124 or program selection data 122 which can be in the form of a channel change but may also be an address request which requests the delivery of programming from a network address. A record signal 126 indicates that the programming or the address of the programming is being recorded by the user. The record signal 126 can also be a printing command, a tape recording command, a bookmark command or any other command intended to store the program being viewed, or program address, for later use.

The material being viewed by the user 120 is referred to as source material 130. The source material 130, as defined herein, is the content that a subscriber selects and may consist of analog video, Motion Picture Expert Group (MPEG) digital video source material, other digital or analog material, Hypertext Markup Language (HTML) or other type of multimedia source material. The subscriber characterization system 100 can access the source material 130 received by the user 120 using a start signal 132 and a stop signal 134, which control the transfer of source related text 136 which can be analyzed as described herein.

In a preferred embodiment, the source related text 136 can be extracted from the source material 130 and stored in memory. The source related text 136, as defined herein, includes source related textual information including descriptive fields which are related to the source material 130, or text which is part of the source material 130 itself. The source related text 136 can be derived from a number of sources including but not limited to closed captioning information, Electronic Program Guide (EPG) material, and text information in the source itself (e.g. text in HTML files).

Electronic Program Guide (EPG) 140 contains information related to the source material 130 which is useful to the user 120. The EPG 140 is typically a navigational tool which contains source related information including but not limited to the programming category, program description, rating, actors, and duration. The structure and content of EPG data is described in detail in U.S. Pat. No. 5,596,373 assigned to Sony Corporation and Sony Electronics which is herein incorporated by reference. As shown in FIG. 1, the EPG 140 can be accessed by the SCS 100 by a request EPG data signal 142 which results in the return of a category 144, a sub-category 146, and a program description 148. EPG information can potentially include fields related to advertising.

In one embodiment of the present invention, EPG data is accessed and program information such as the category 144, the sub-category 146, and the program description 148 are stored in memory.

In another embodiment of the present invention, the source related text 136 is the closed captioning text embedded in the analog or digital video signal. Such closed captioning text can be stored in memory for processing to extract the program characteristic vectors 150.

One of the functions of the SCS 100 is to generate the program characteristics vectors 150 which are comprised of program characteristics data 152, as illustrated in FIG. 1. The program characteristics data 152, which can be used to create the program characteristics vectors 150 both in vector and table form, are examples of source related information which represent characteristics of the source material. In a preferred embodiment, the program characteristics vectors 150 are lists of values which characterize the programming (source) material in according to the category 144, the sub-category 146, and the program description 148. The present invention may also be applied to advertisements, in which case program characteristics vectors contain, as an example, a product category, a product sub-category, and a brand name.

As illustrated in FIG. 1, the SCS 100 uses heuristic rules 160. The heuristic rules 160, as described herein, are composed of both logical heuristic rules as well as heuristic rules expressed in terms of conditional probabilities. The heuristic rules 160 can be accessed by the SCS 100 via a request rules signal 162 which results in the transfer of a copy of rules 164 to the SCS 100.

The SCS 100 forms program demographic vectors 170 from program demographics 172, as illustrated in FIG. 1. The program demographic vectors 170 also represent characteristics of source related information in the form of the intended or expected demographics of the audience for which the source material is intended.

Subscriber selection data 110 is obtained from the monitored activities of the user and in a preferred embodiment can be stored in a dedicated memory. In an alternate embodiment, the subscriber selection data 110 is stored in a storage disk. Information which is utilized to form the subscriber selection data 110 includes time 112, which corresponds to the time of an event, channel ID 114, program ID 116, volume level 118, channel change record 119, and program title 117. A detailed record of selection data is illustrated in FIG. 6.

In a preferred embodiment, a household viewing habits 195 illustrated in FIG. 1 is computed from the subscriber selection data 110. The SCS 100 transfers household viewing data 197 to form household viewing habits 195. The household viewing data 197 is derived from the subscriber selection data 110 by looking at viewing habits at a particular time of day over an extended period of time, usually several days or weeks, and making some generalizations regarding the viewing habits during that time period.

The program characteristics vector 150 is derived from the source related text 136 and/or from the EPG 140 by applying information retrieval techniques. The details of this process are discussed in accordance with FIG. 8.

The program characteristics vector 150 is used in combination with a set of the heuristic rules 160 to define a set of the program demographic vectors 170 illustrated in FIG. 1 describing the audience the program is intended for.

One output of the SCS 100 is a household profile including household demographic characteristics 190 and a household interest profile 180. The household demographic characteristics 190 resulting from the transfer of household demographic data 192, and the household interest profile 180, resulting from the transfer of household interests data 182. Both the household demographics characteristics 190 and the household interest profile 180 have a session value and an average value, as will be discussed herein.

Figure 2:
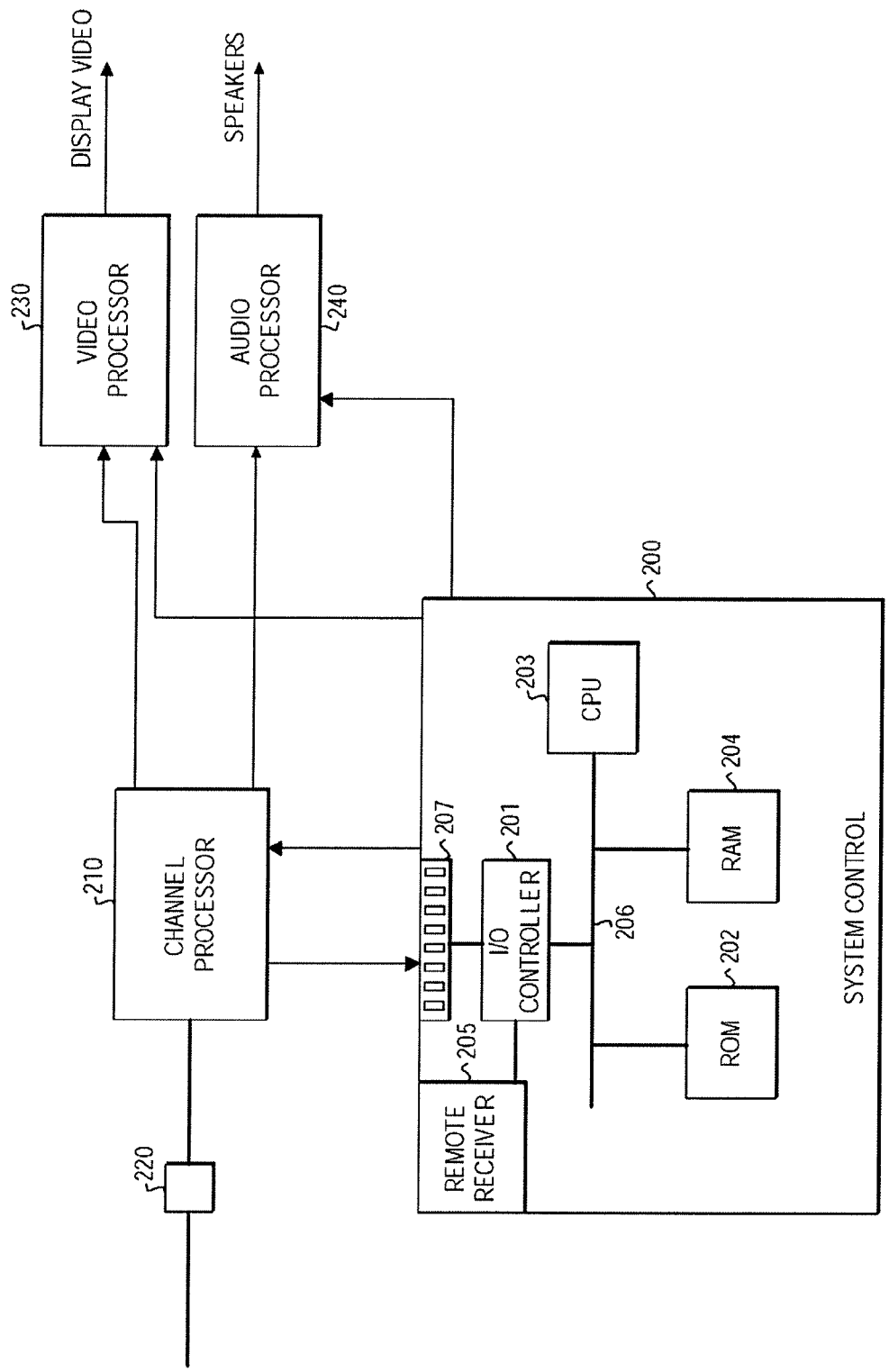
FIG. 2 illustrates a block diagram for a realization of a subscriber monitoring system for receiving video signals.

The monitoring system depicted in FIG. 2 is responsible for monitoring the subscriber activities, and can be used to realize the SCS 100. In a preferred embodiment, the monitoring system of FIG. 2 is located in a television set-top device or in the television itself. In an alternate embodiment, the monitoring system is part of a computer which receives programming from a network.

In an application of the system for television services, an input connector 220 accepts the video signal coming either from an antenna, cable television input, or other network. The video signal can be analog or Digital MPEG. Alternatively, the video source may be a video stream or other multimedia stream from a communications network including the Internet.

In the case of either analog or digital video, selected fields are defined to carry EPG data or closed captioning text. For analog video, the closed captioning text is embedded in the vertical blanking interval (VBI). As described in U.S. Pat. No. 5,579,005, assigned to Scientific-Atlanta, Inc., the EPG information can be carried in a dedicated channel or embedded in the VBI. For digital video, the closed captioning text is carried as video user bits in a user data field. The EPG data is transmitted as ancillary data and is multiplexed at the transport layer with the audio and video data.

Referring to FIG. 2, a system control unit 200 receives commands from the user 120, decodes the command and forwards the command to the destined module. In a preferred embodiment, the commands are entered via a remote control to a remote receiver 205 or a set of selection buttons 207 available at the front panel of the system control unit 200. In an alternate embodiment, the commands are entered by the user 120 via a keyboard.

The system control unit 200 also contains a Central Processing Unit (CPU) 203 for processing and supervising all of the operations of the system control unit 200, a Read Only Memory (ROM) 202 containing the software and fixed data, a Random Access Memory (RAM) 204 for storing data. CPU 203, RAM 204, ROM 202, and I/O controller 201 are attached to a master bus 206. A power supply in a form of battery can also be included in the system control unit 200 for backup in case of power outage.

An input/output (I/O) controller 201 interfaces the system control unit 200 with external devices. In a preferred embodiment, the I/O controller 201 interfaces to the remote receiver 205 and a selection button such as the channel change button on a remote control. In an alternate embodiment, it can accept input from a keyboard or a mouse.

The program selection data 122 is forwarded to a channel processor 210. The channel processor 210 tunes to a selected channel and the media stream is decomposed into its basic components: the video stream, the audio stream, and the data stream. The video stream is directed to a video processor module 230 where it is decoded and further processed for display to the TV screen. The audio stream is directed to an audio processor 240 for decoding and output to the speakers.

The data stream can be EPG data, closed captioning text, Extended Data Service (EDS) information, a combination of these, or an alternate type of data. In the case of EDS the call sign, program name and other useful data are provided. In a preferred embodiment, the data stream is stored in a reserved location of the RAM 204. In an alternate embodiment, a magnetic disk is used for data storage. The system control unit 200 writes also in a dedicated memory, which in a preferred embodiment is the RAM 204, the selected channel, the time 112 of selection, the volume level 118 and the program ID 116 and the program title 117. Upon receiving the program selection data 122, the new selected channel is directed to the channel processor 210 and the system control unit 200 writes to the dedicated memory the channel selection end time and the program title 117 at the time 112 of channel change. The system control unit 200 keeps track of the number of channel changes occurring during the viewing time via the channel change record 119. This data forms part of the subscriber selection data 110.

The volume control signal 124 is sent to the audio processor 240. In a preferred embodiment, the volume level 118 selected by the user 120 corresponds to the listening volume. In an alternate embodiment, the volume level 118 selected by the user 120 represents a volume level to another piece of equipment such as an audio system (home theatre system) or to the television itself. In such a case, the volume can be measured directly by a microphone or other audio sensing device which can monitor the volume at which the selected source material is being listened.

A program change occurring while watching a selected channel is also logged by the system control unit 200. Monitoring the content of the program at the time of the program change can be done by reading the content of the EDS. The EDS contains information such as program title, which is transmitted via the VBI. A change on the program title field is detected by the monitoring system and logged as an event. In an alternate embodiment, an EPG is present and program information can be extracted from the EPG. In a preferred embodiment, the programming data received from the EDS or EPG permits distinguishing between entertainment programming and advertisements.

Figure 3:
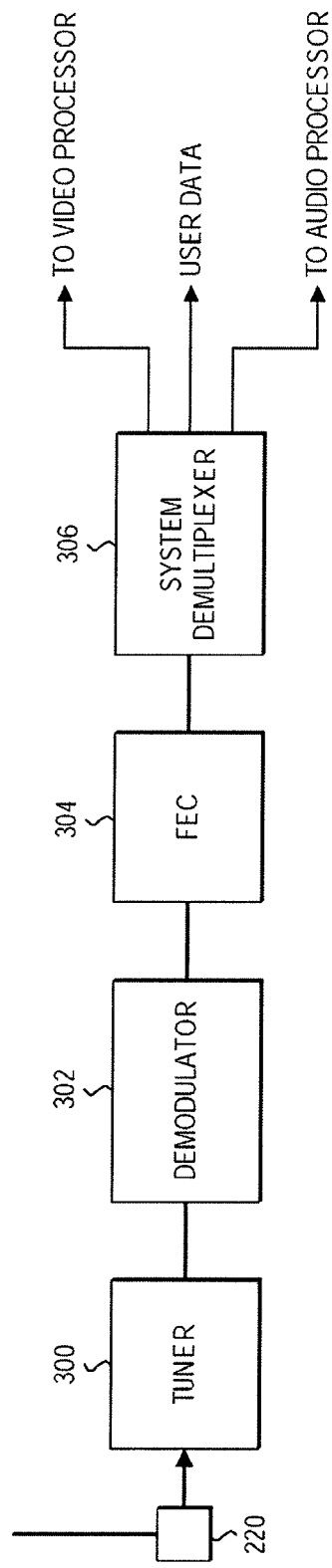
FIG. 3 illustrates a block diagram of a channel processor.

FIG. 3 shows the block diagram of the channel processor 210. In a preferred embodiment, the input connector 220 connects to a tuner 300 which tunes to the selected channel. A local oscillator can be used to heterodyne the signal to the IF signal. A demodulator 302 demodulates the received signal and the output is fed to an FEC decoder 304. The data stream received from the FEC decoder 304 is, in a preferred embodiment, in an MPEG format. In a preferred embodiment, system demultiplexer 306 separates out video and audio information for subsequent decompression and processing, as well as ancillary data which can contain program related information.

The data stream presented to the system demultiplexer 306 consists of packets of data including video, audio and ancillary data. The system demultiplexer 306 identifies each packet from the stream ID and directs the stream to the corresponding processor. The video data is directed to the video processor module 230 and the audio data is directed to the audio processor 240. The ancillary data can contain closed captioning text, emergency messages, program guide, or other useful information.

Closed captioning text is considered to be ancillary data and is thus contained in the video stream. The system demultiplexer 306 accesses the user data field of the video stream to extract the closed captioning text. The program guide, if present, is carried on data stream identified by a specific transport program identifier.

In an alternate embodiment, analog video can be used. For analog programming, ancillary data such as closed captioning text or EDS data are carried in a vertical blanking interval.

Figure 4:
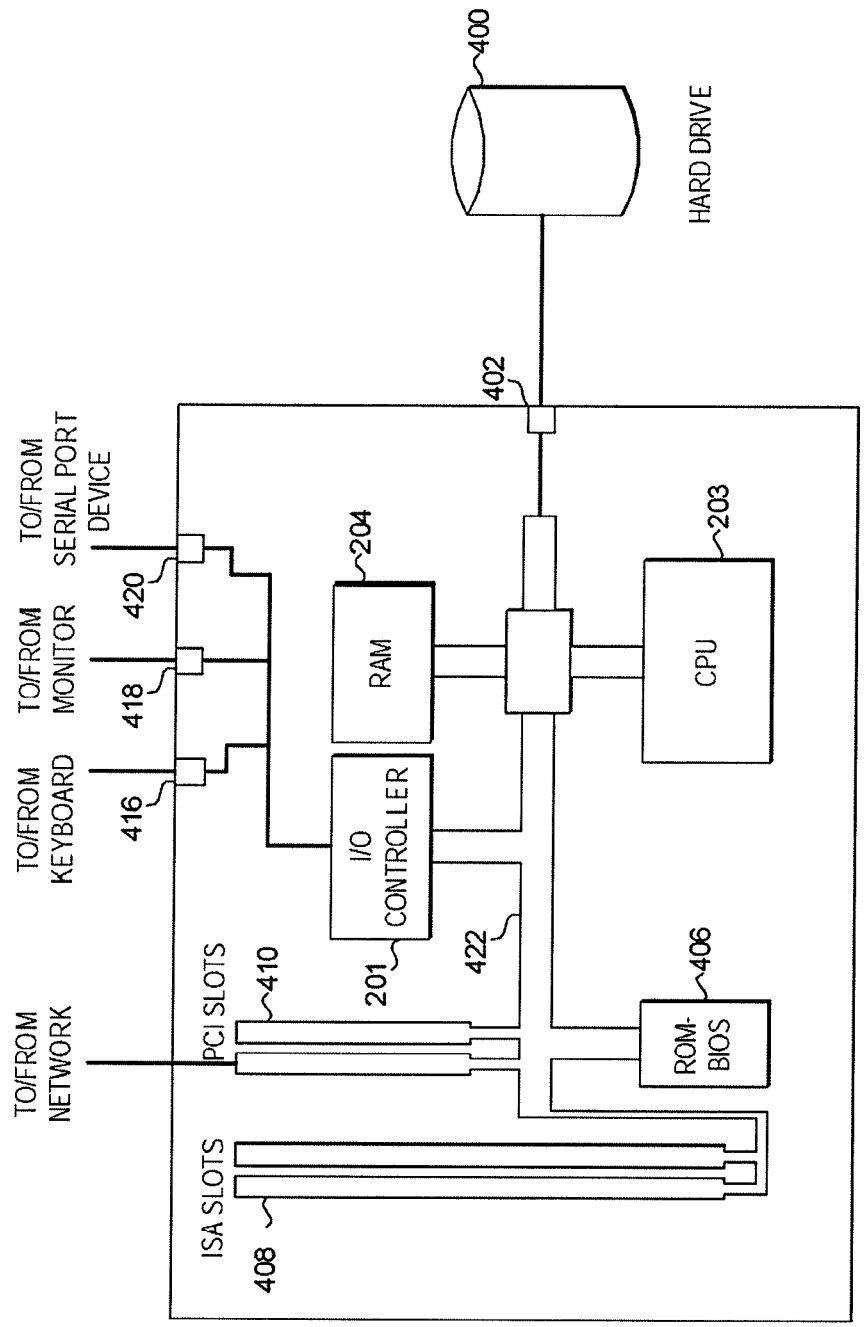
FIG. 4 illustrates a block diagram of a computer for a realization of the subscriber monitoring system.

FIG. 4 shows the block diagram of a computer system for a realization of the subscriber monitoring system based on the reception of multimedia signals from a bi-directional network. A system bus 422 transports data amongst the CPU 203, the RAM 204, Read Only Memory—Basic Input Output System (ROM-BIOS) 406 and other components. The CPU 203 accesses a hard drive 400 through a disk controller 402. The standard input/output devices are connected to the system bus 422 through the I/O controller 201. A keyboard is attached to the I/O controller 201 through a keyboard port 416 and the monitor is connected through a monitor port 418. The serial port device uses a serial port 420 to communicate with the I/O controller 201. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network.

Figure 5:
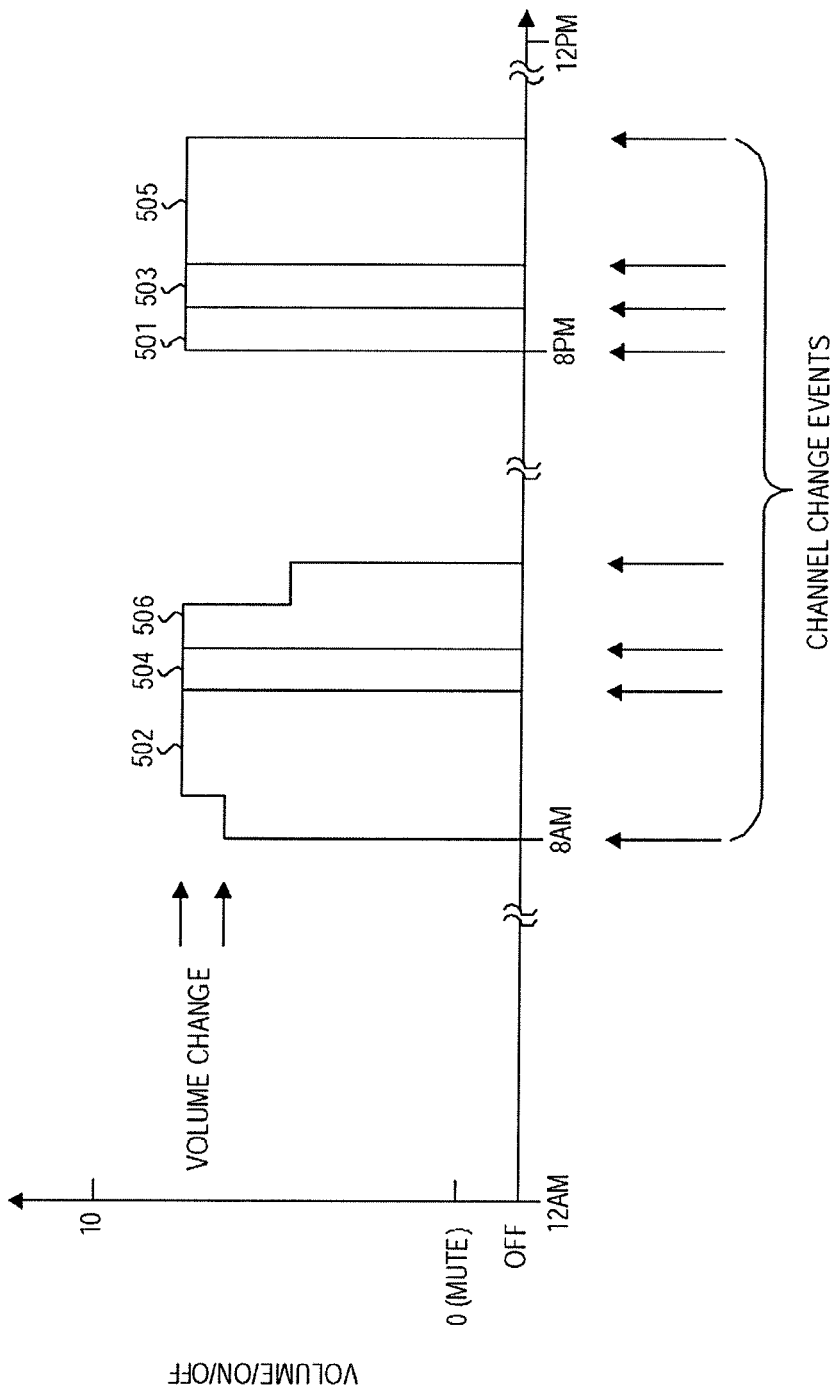
FIG. 5 illustrates a channel sequence and volume over a twenty-four (24) hour period.

FIG. 5 illustrates a channel sequence and volume over a twenty-four (24) hour period. The Y-axis represents the status of the receiver in terms of on/off status and volume level. The X-axis represents the time of day. The channels viewed are represented by the windows 501-506, with a first channel 502 being watched followed by the viewing of a second channel 504, and a third channel 506 in the morning. In the evening a fourth channel 501 is watched, a fifth channel 503, and a sixth channel 505. A channel change is illustrated by a momentary transition to the "off" status and a volume change is represented by a change of level on the Y-axis.

A detailed record of the subscriber selection data 110 is illustrated in FIG. 6 in a table format. A time column 602 contains the starting time of every event occurring during the viewing time. A Channel ID column 604 lists the channels viewed or visited during that period. A program title column 603 contains the titles of all programs viewed. A volume column 601 contains the volume level 118 at the time 112 of viewing a selected channel.

A representative statistical record corresponding to the household viewing habits 195 is illustrated in FIG. 7. In a preferred embodiment, a time of day column 700 is organized in period of time including morning, mid-day, afternoon, night, and late night. In an alternate embodiment, smaller time periods are used. A minutes watched column 702 lists, for each period of time, the time in minutes in which the SCS 100 recorded delivery of programming. The number of channel changes during that period and the average volume are also included in that table in a channel changes column 704 and an average volume column 706 respectively. The last row of the statistical record contains the totals for the items listed in the minutes watched column 702, the channel changes column 704 and the average volume 706.

Figure 8A:
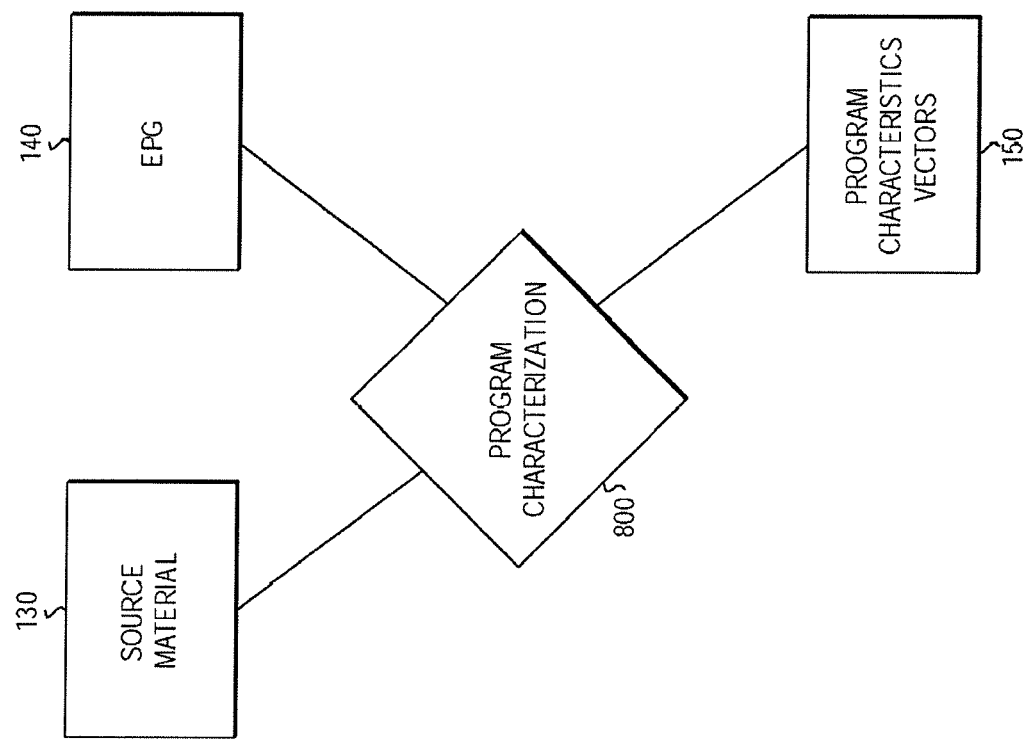
FIG. 8A illustrates an entity-relationship diagram for the generation of program characteristics vectors.

FIG. 8A illustrates an entity-relationship diagram for the generation of the program characteristics vector 150. The context vector generation and retrieval technique described in U.S. Pat. No. 5,619,709, which is incorporated herein by reference, can be applied for the generation of the program characteristics vectors 150. Other techniques are well known by those skilled in the art.

Referring to FIG. 8A, the source material 130 or the EPG 140 are passed through a program characterization process 800 to generate the program characteristics vectors 150. The program characterization process 800 is described in accordance with FIG. 8B. Program content descriptors including a first program content descriptor 802, a second program content descriptor 804 and an nth program content descriptor 806, each classified in terms of the category 144, the sub-category 146, and other divisions as identified in the industry accepted program classification system, are presented to a context vector generator 820. As an example, the program content descriptor can be text representative of the expected content of material found in the particular program category 144. In this example, the program content descriptors 802, 804 and 806 would contain text representative of what would be found in programs in the news, fiction, and advertising categories respectively. The context vector generator 820 generates context vectors for that set of sample texts resulting in a first summary context vector 808, a second summary context vector 810, and an nth summary context vector 812. In the example given, the summary context vectors 808, 810, and 812 correspond to the categories of news, fiction and advertising respectively. The summary vectors are stored in a local data storage system.

Figure 8B:
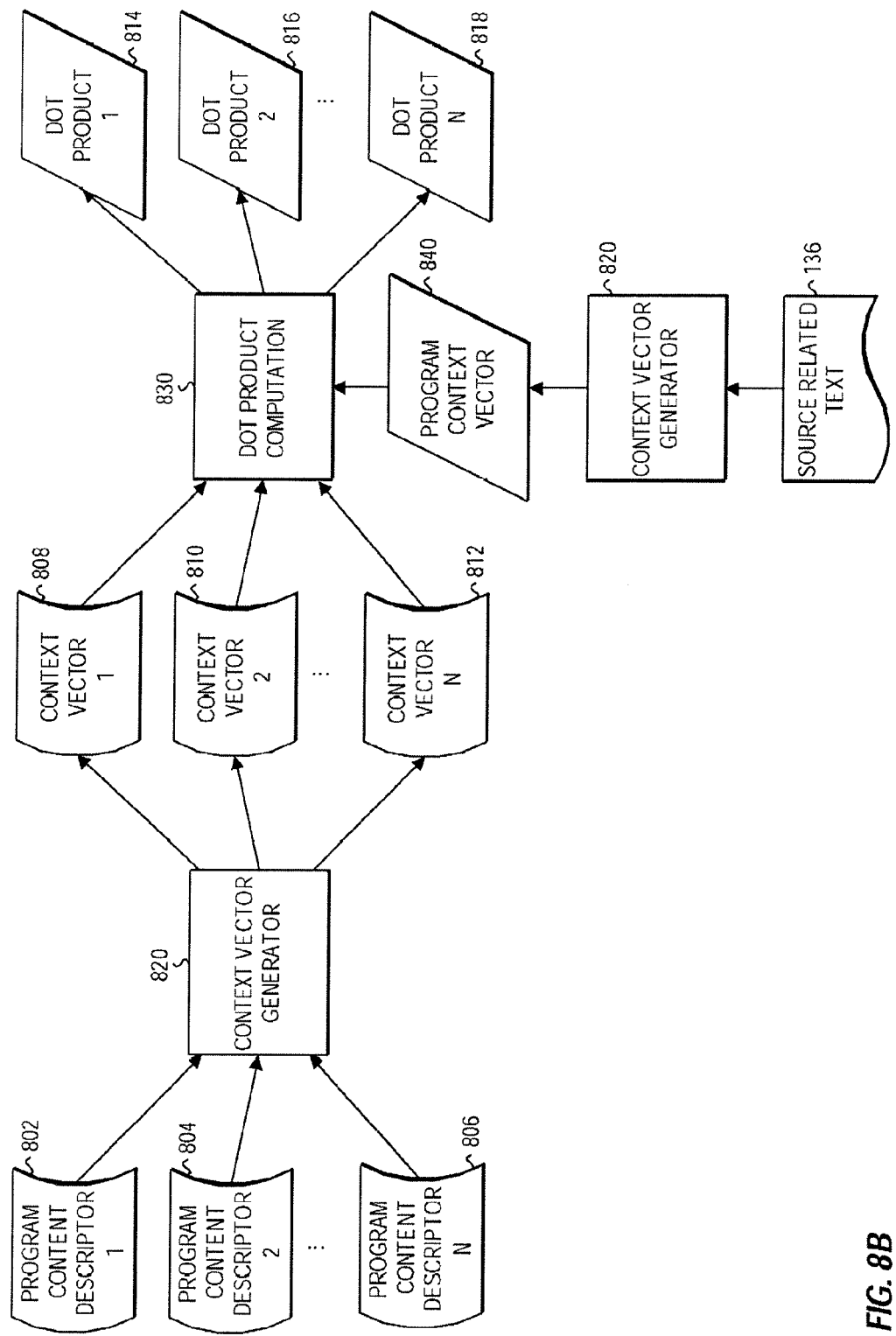
FIG. 8B illustrates a flowchart for program characterization.

Referring to FIG. 8B, a sample of the source related text 136 which is associated with the new program to be classified is passed to the context vector generator 820 which generates a program context vector 840 for that program. The source related text 136 can be either the source material 130, the EPG 140, or other text associated with the source material. A comparison is made between the actual program context vectors and the stored program content context vectors by computing, in a dot product computation process 830, the dot product of the first summary context vector 808 with the program context vector 840 to produce a first dot product 814. Similar operations are performed to produce second dot product 816 and nth dot product 818.

The values contained in the dot products 814, 816 and 818, while not probabilistic in nature, can be expressed in probabilistic terms using a simple transformation in which the result represents a confidence level of assigning the corresponding content to that program. The transformed values add up to one. The dot products can be used to classify a program, or form a weighted sum of classifications which results in the program characteristics vectors 150. In the example given, if the source related text 136 was from an advertisement, the nth dot product 818 would have a high value, indicating that the advertising category was the most appropriate category, and assigning a high probability value to that category. If the dot products corresponding to the other categories were significantly higher than zero, those categories would be assigned a value, with the result being the program characteristics vectors 150 as shown in FIG. 9D.

For the sub-categories, probabilities obtained from the content pertaining to the same sub-category 146 are summed to form the probability for the new program being in that sub-category 146. At the sub-category level, the same method is applied to compute the probability of a program being from the given category 144. The three levels of the program classification system; the category 144, the sub-category 146 and the content, are used by the program characterization process 800 to form the program characteristics vectors 150 which are depicted in FIGS. 9D-9F.

Figure 9A:
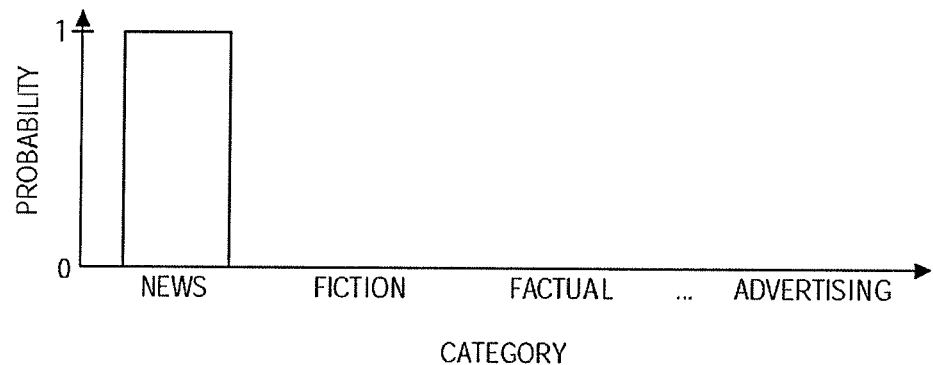
FIG. 9A illustrates a deterministic program category vector.
Figure 9B:
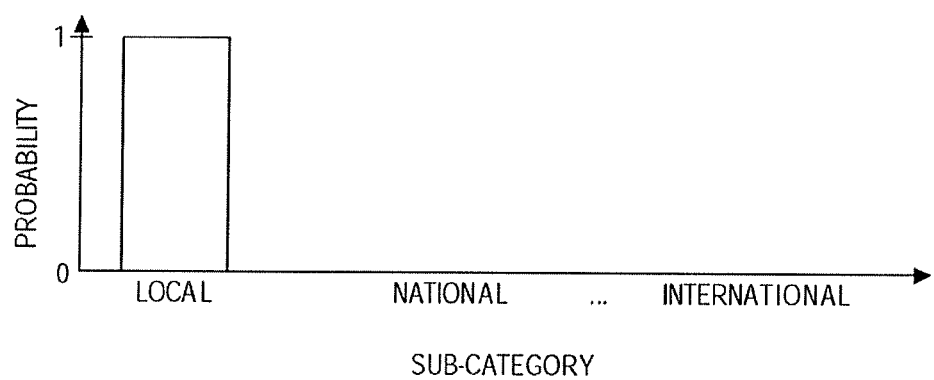
FIG. 9B illustrates a deterministic program sub-category vector.
Figure 9C:
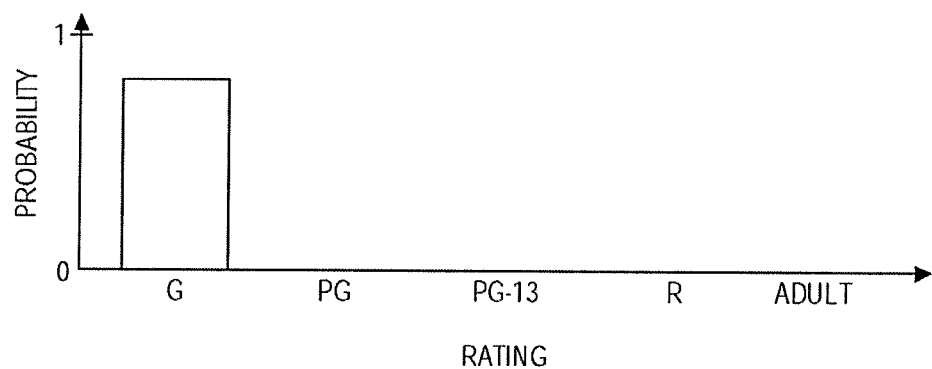
FIG. 9C illustrates a deterministic program rating vector.
Figure 9D:
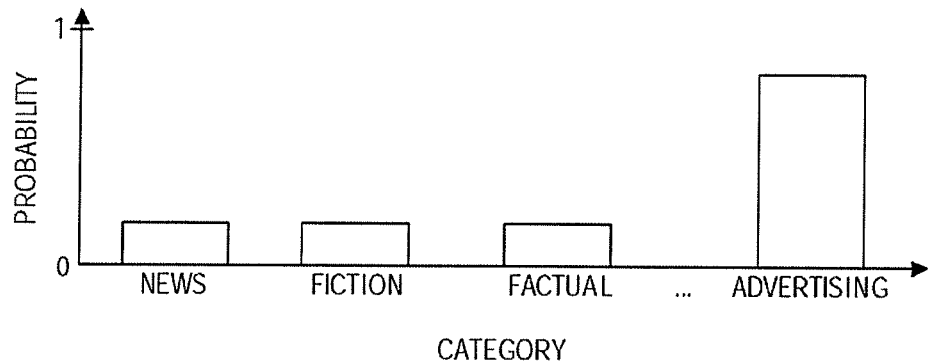
FIG. 9D illustrates a probabilistic program category vector.
Figure 9E:
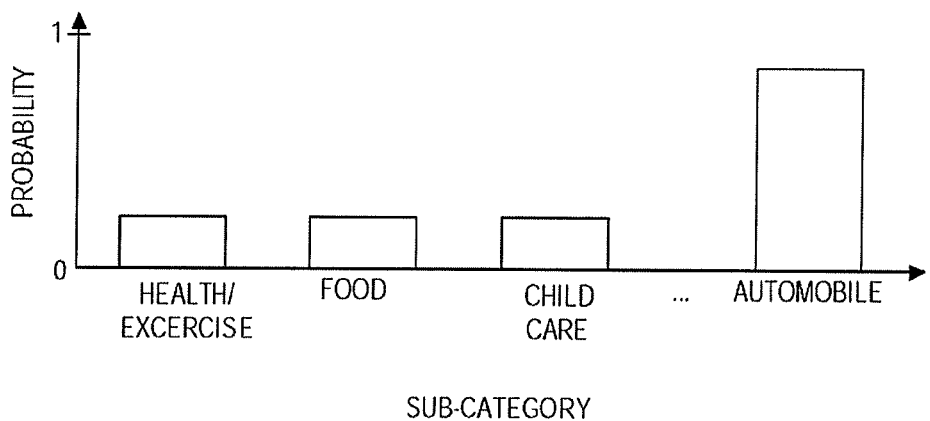
FIG. 9E illustrates a probabilistic program sub-category vector.
Figure 9F:
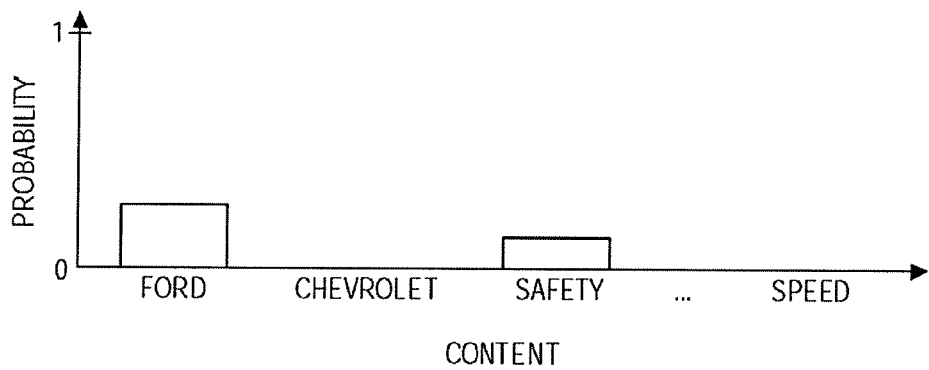
FIG. 9F illustrates a probabilistic program content vector.

The program characteristics vectors 150 in general are represented in FIGS. 9A through 9F. FIGS. 9A, 9B and 9C are an example of deterministic program vectors. This set of vectors is generated when the program characteristics are well defined, as can occur when the source related text 136 or the EPG 140 contains specific fields identifying the category 144 and the sub-category 146. A program rating can also provided by the EPG 140.

In the case that these characteristics are not specified, a statistical set of vectors is generated from the process described in accordance with FIG. 8. FIG. 9D shows the probability that a program being watched is from the given category 144. The categories are listed in the X-axis. The sub-category 146 is also expressed in terms of probability. This is shown in FIG. 9E. The content component of this set of vectors is a third possible level of the program classification, and is illustrated in FIG. 9F.

Figure 10A:
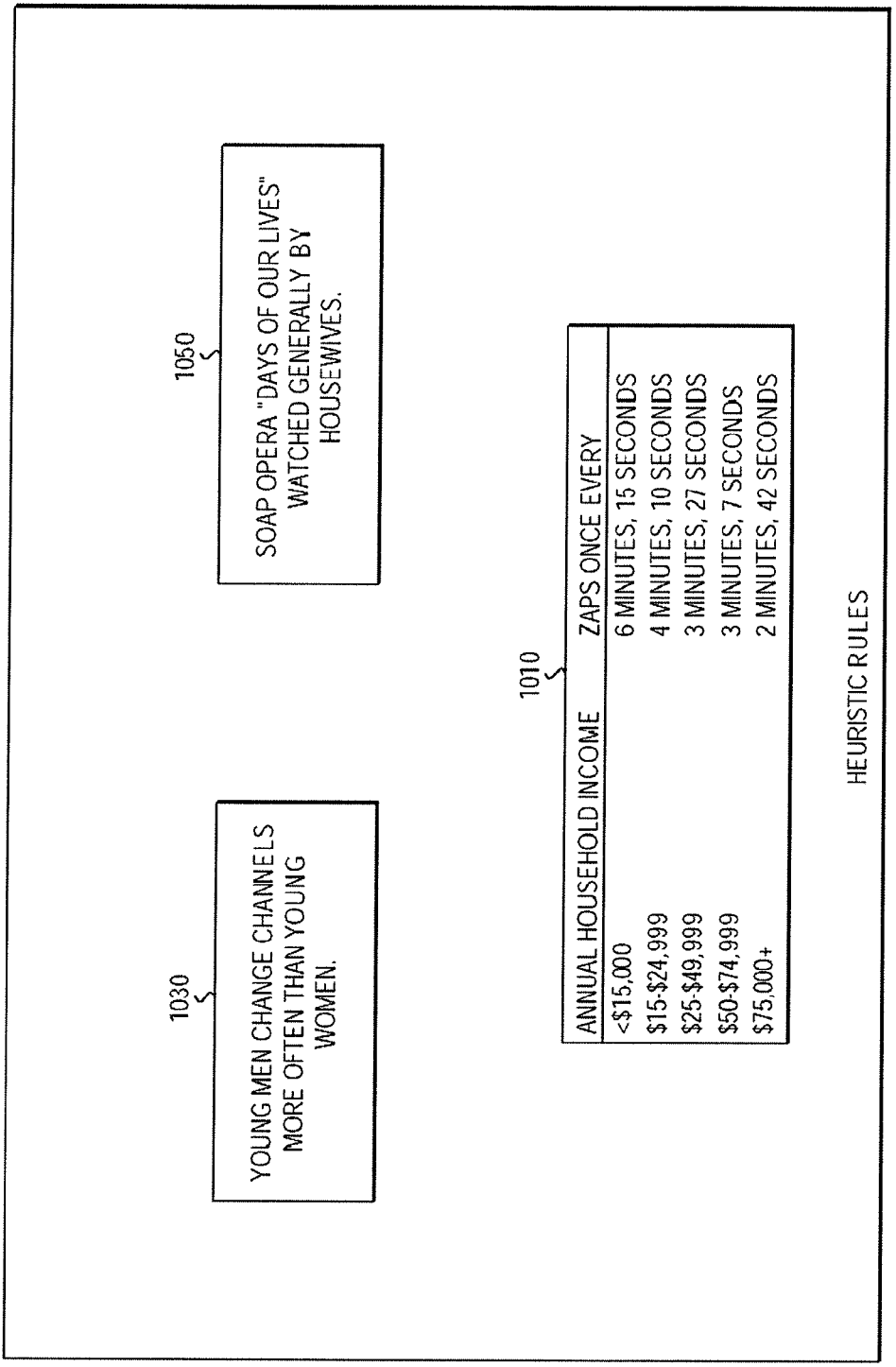
FIG. 10A illustrates a set of logical heuristic rules.

FIG. 10A illustrates sets of logical heuristics rules which form part of the heuristic rules 160. In a preferred embodiment, logical heuristic rules are obtained from sociological or psychological studies. Two types of rules are illustrated in FIG. 10A. The first type links an individual's viewing characteristics to demographic characteristics such as gender, age, and income level. A channel changing rate rule 1030 attempts to determine gender based on channel change rate. An income related channel change rate rule 1010 attempts to link channel change rates to income brackets. A second type of rules links particular programs to particular audience, as illustrated by a gender determining rule 1050 which links the program category 144/sub-category 146 with a gender. The result of the application of the logical heuristic rules illustrated in FIG. 10A are probabilistic determinations of factors including gender, age, and income level. Although a specific set of logical heuristic rules has been used as an example, a wide number of types of logical heuristic rules can be used to realize the present invention. In addition, these rules can be changed based on learning within the system or based on external studies which provide more accurate rules.

FIG. 10B illustrates a set of the heuristic rules 160 expressed in terms of conditional probabilities. In the example shown in FIG. 10B, the category 144 has associated with it conditional probabilities for demographic factors such as age, income, family size and gender composition. The category 144 has associated with it conditional probabilities that represent probability that the viewing group is within a certain age group dependent on the probability that they are viewing a program in that category 144.

Figure 11:
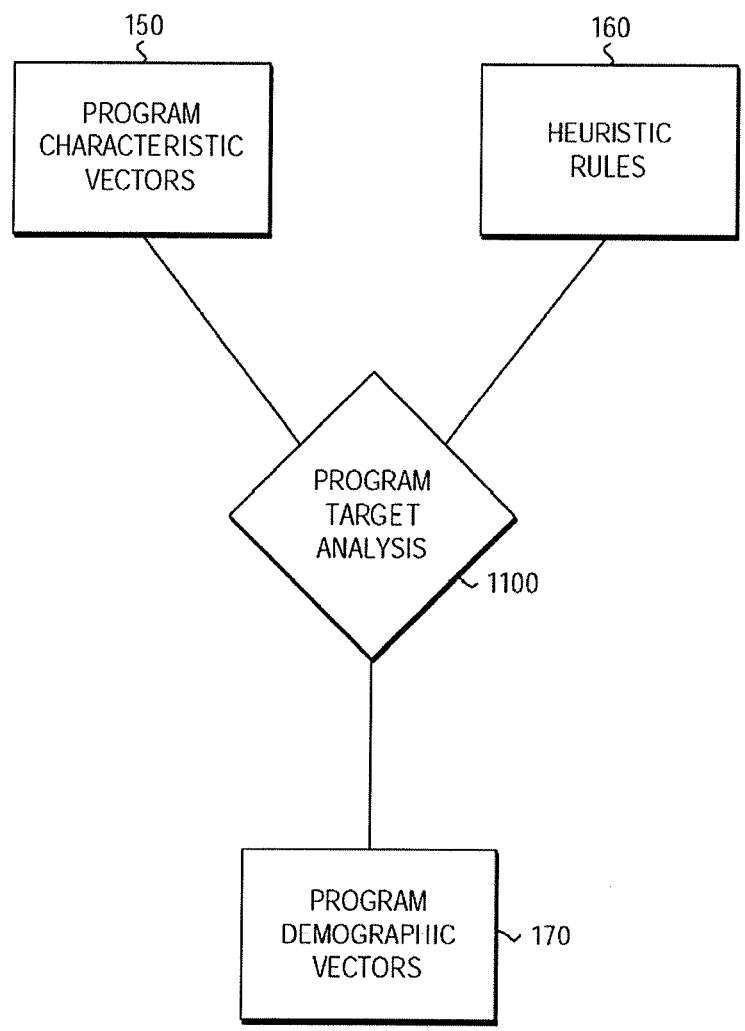
FIG. 11 illustrates an entity-relationship diagram for the generation of program demographic vectors.

FIG. 11 illustrates an entity-relationship diagram for the generation of the program demographic vectors 170. In a preferred embodiment, the heuristic rules 160 are applied along with the program characteristic vectors 150 in a program target analysis process 1100 to form the program demographic vectors 170. The program characteristic vectors 150 indicate a particular aspect of a program, such as its violence level. The heuristic rules 160 indicate that a particular demographic group has a preference for that program. As an example, it may be the case that young males have a higher preference for violent programs than other sectors of the population. Thus, a program which has the program characteristic vectors 150 indicating a high probability of having violent content, when combined with the heuristic rules 160 indicating that "young males like violent programs," will result, through the program target analysis process 1100, in the program demographic vectors 170 which indicate that there is a high probability that the program is being watched by a young male.

The program target analysis process 1100 can be realized using software programmed in a variety of languages which processes mathematically the heuristic rules 160 to derive the program demographic vectors 170. The table representation of the heuristic rules 160 illustrated in FIG. 10B expresses the probability that the individual or household is from a specific demographic group based on a program with a particular category 144. This can be expressed, using probability terms as follow "the probability that the individuals are in a given demographic group conditional to the program being in a given category". Referring to FIG. 9D, the probability that the group has certain demographic characteristics based on the program being in a specific category is illustrated.

Expressing the probability that a program is destined to a specific demographic group can be determined by applying Bayes rule. This probability is the sum of the conditional probabilities that the demographic group likes the program, conditional to the category 144 weighted by the probability that the program is from that category 144. In a preferred embodiment, the program target analysis can calculate the program demographic vectors by application of logical heuristic rules, as illustrated in FIG. 10A, and by application of heuristic rules expressed as conditional probabilities as shown in FIG. 10B. Logical heuristic rules can be applied using logical programming and fuzzy logic using techniques well understood by those skilled in the art, and are discussed in the text by S. V. Kartalopoulos entitled "Understanding Neural Networks and Fuzzy Logic" which is incorporated herein by reference.

Conditional probabilities can be applied by simple mathematical operations multiplying program context vectors by matrices of conditional probabilities. By performing this process over all the demographic groups, the program target analysis process 1100 can measure how likely a program is to be of interest to each demographic group. Those probabilities values form the program demographic vector 170 represented in FIG. 12.

As an example, the heuristic rules expressed as conditional probabilities shown in FIG. 10B are used as part of a matrix multiplication in which the program characteristics vector 150 of dimension N, such as those shown in FIGS. 9A-9F is multiplied by an N×M matrix of heuristic rules expressed as conditional probabilities, such as that shown in FIG. 10B. The resulting vector of dimension M is a weighted average of the conditional probabilities for each category and represents the household demographic characteristics 190. Similar processing can be performed at the sub-category and content levels.

Figure 12:
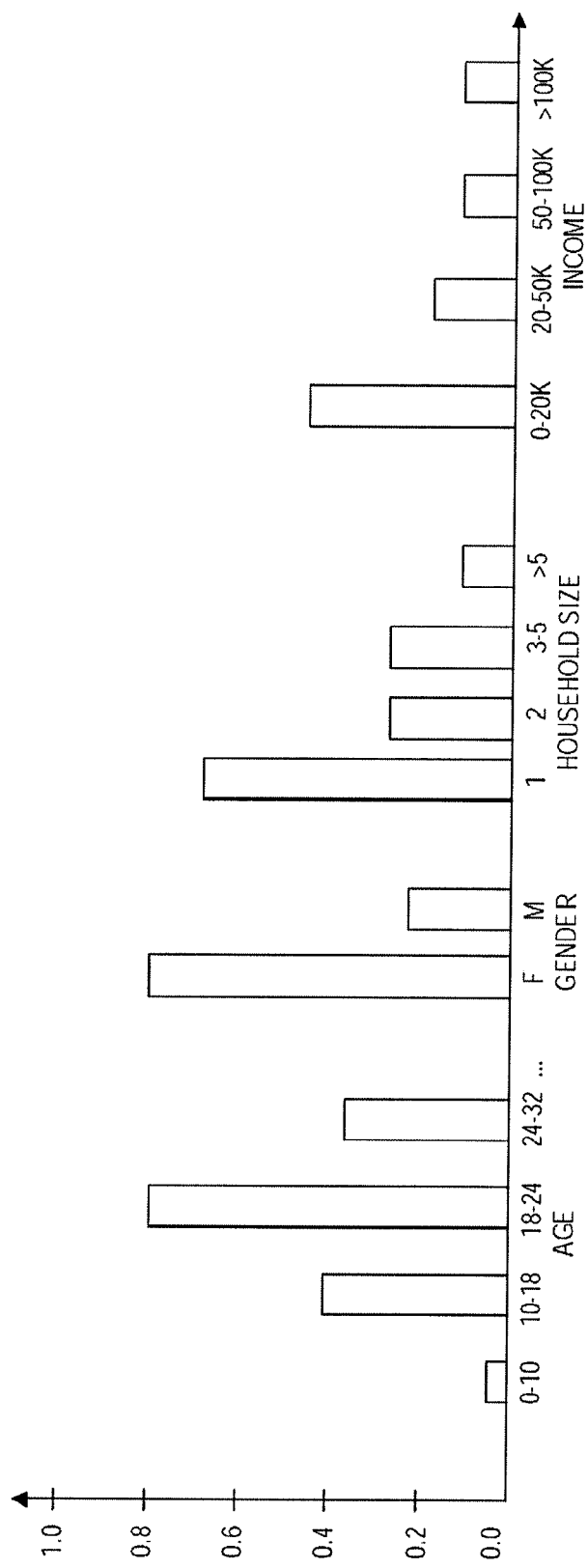
FIG. 12 illustrates a program demographic vector.

FIG. 12 illustrates an example of the program demographic vector 170, and shows the extent to which a particular program is destined to a particular audience. This is measured in terms of probability as depicted in FIG. 12. The Y-axis is the probability of appealing to the demographic group identified on the X-axis.

Figure 13:
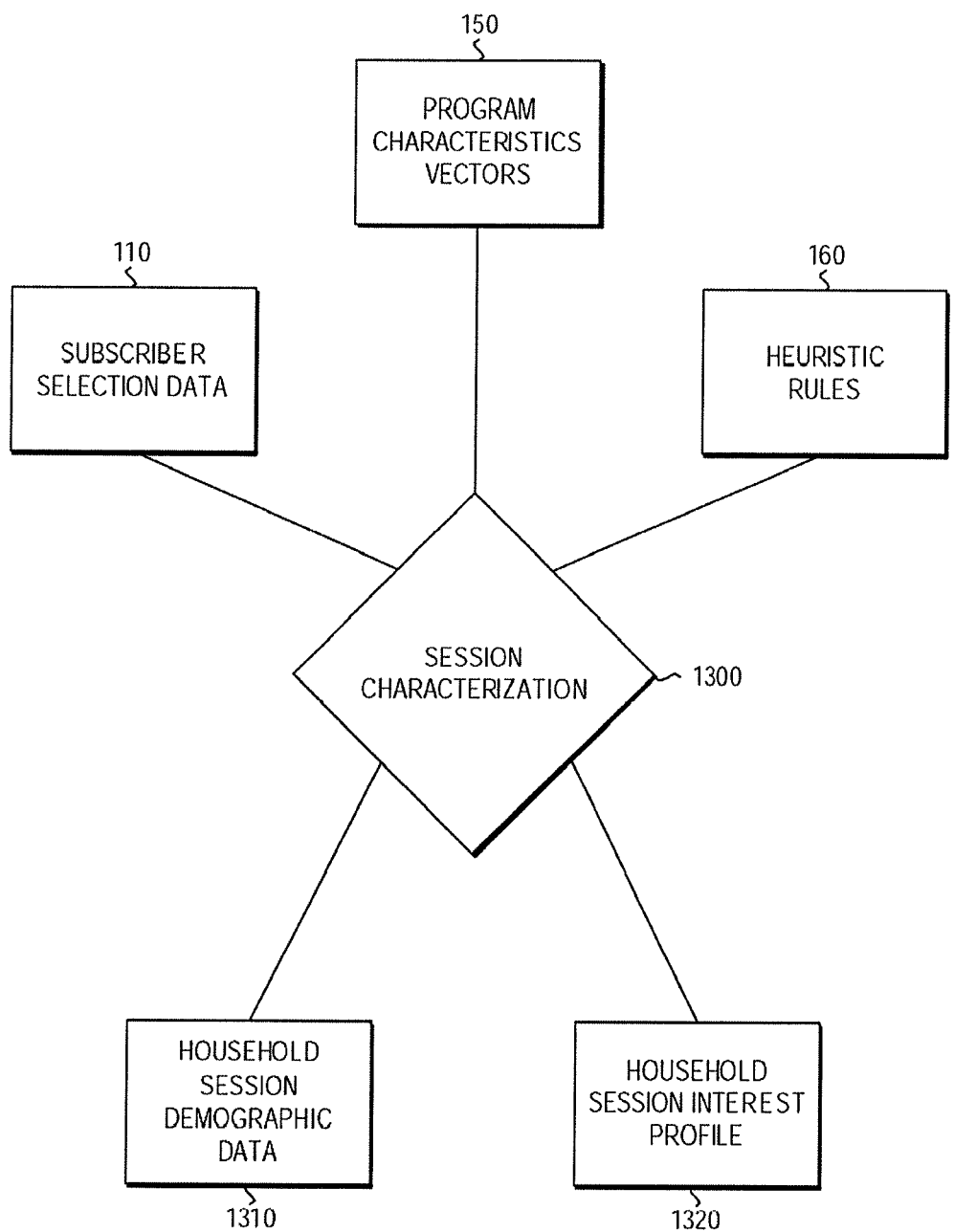
FIG. 13 illustrates an entity-relationship diagram for the generation of household session demographic data and household session interest profiles.

FIG. 13 illustrates an entity-relationship diagram for the generation of household session demographic data 1310 and household session interest profile 1320. In a preferred embodiment, the subscriber selection data 110 is used along with the program characteristics vectors 150 in a session characterization process 1300 to generate the household session interest profile 1320. The subscriber selection data 110 indicates what the subscriber is watching, for how long and at what volume they are watching the program.

In a preferred embodiment, the session characterization process 1300 forms a weighted average of the program characteristics vectors 150 in which the time duration the program is watched is normalized to the session time (typically defined as the time from which the unit was turned on to the present). The program characteristics vectors 150 are multiplied by the normalized time duration (which is less than one unless only one program has been viewed) and summed with the previous value. Time duration data, along with other subscriber viewing information, is available from the subscriber selection data 110. The resulting weighted average of program characteristics vectors forms the household session interest profile 1320, with each program contributing to the household session interest profile 1320 according to how long it was watched. The household session interest profile 1320 is normalized to produce probabilistic values of the household programming interests during that session.

In an alternate embodiment, the heuristic rules 160 are applied to both the subscriber selection data 110 and the program characteristics vectors 150 to generate the household session demographic data 1310 and the household session interest profile 1320. In this embodiment, weighted averages of the program characteristics vectors 150 are formed based on the subscriber selection data 110, and the heuristic rules 160 are applied. In the case of logical heuristic rules as shown in FIG. 10A, logical programming can be applied to make determinations regarding the household session demographic data 1310 and the household session interest profile 1320. In the case of heuristic rules in the form of conditional probabilities such as those illustrated in FIG. 10B, a dot product of the time averaged values of the program characteristics vectors can be taken with the appropriate matrix of heuristic rules to generate both the household session demographic data 1310 and the household session interest profile 1320.

Volume control measurements which form part of the subscriber selection data 110 can also be applied in the session characterization process 1300 to form a household session interest profile 1320. This can be accomplished by using normalized volume measurements in a weighted average manner similar to how time duration is used. Thus, muting a show results in a zero value for volume, and the program characteristics vector 150 for this show will not be averaged into the household session interest profile 1320.

Figure 14:
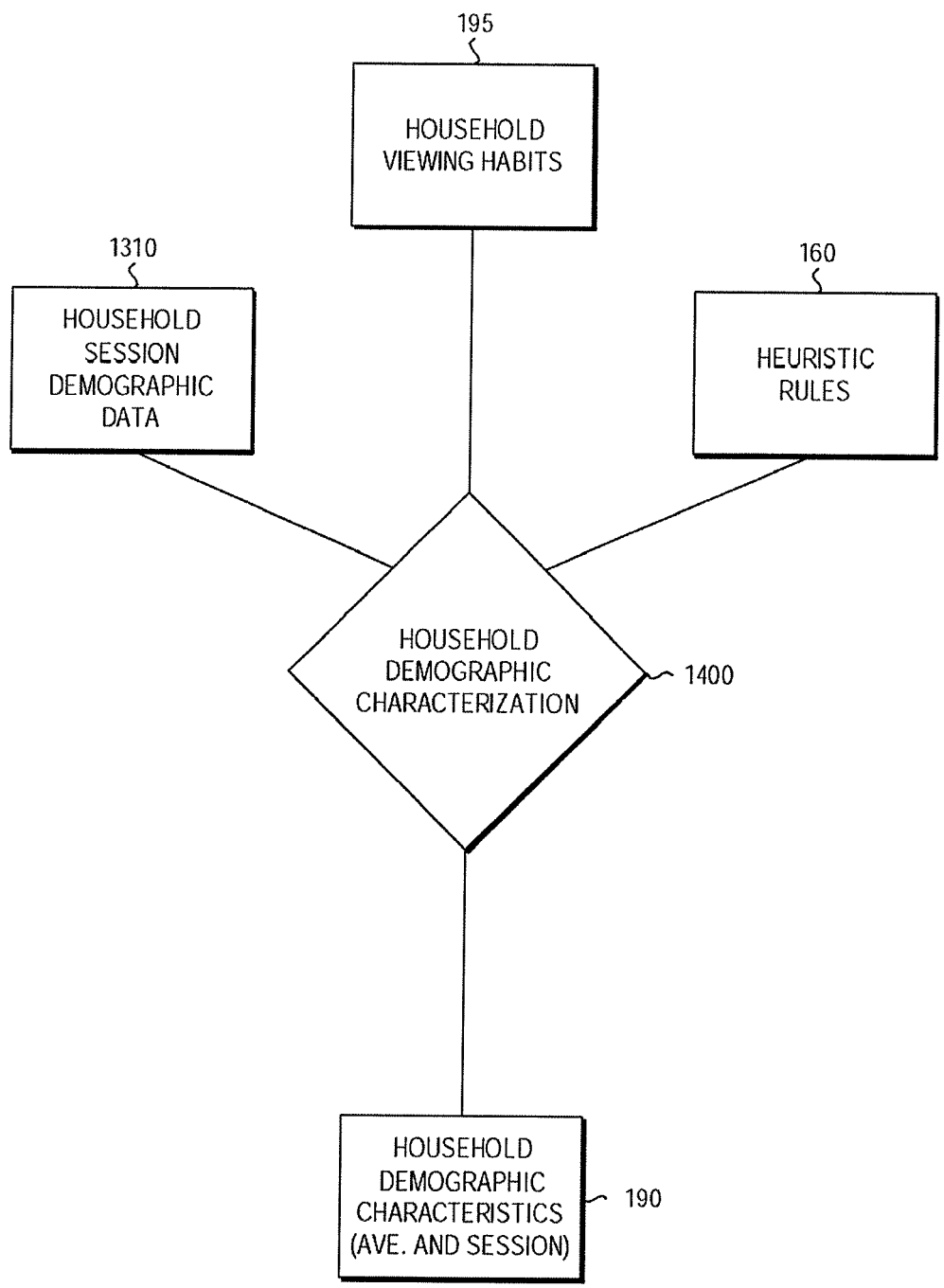
FIG. 14 illustrates an entity-relationship diagram for the generation of average and session household demographic characteristics.

FIG. 14 illustrates an entity-relationship diagram for the generation of average household demographic characteristics and session household demographic characteristics 190. A household demographic characterization process 1400 generates the household demographic characteristics 190 represented in table format in FIG. 15. The household demographic characterization process 1400 uses the household viewing habits 195 in combination with the heuristic rules 160 to determine demographic data. For example, a household with a number of minutes watched of zero during the day may indicate a household with two working adults. Both logical heuristic rules as well as rules based on conditional probabilities can be applied to the household viewing habits 195 to obtain the household demographics characteristics 190.

The household viewing habits 195 is also used by the system to detect out-of-habits events. For example, if a household with a zero value for the minutes watched column 702 at late night presents a session value at that time via the household session demographic data 1310, this session will be characterized as an out-of-habits event and the system can exclude such data from the average if it is highly probable that the demographics for that session are greatly different than the average demographics for the household. Nevertheless, the results of the application of the household demographic characterization process 1400 to the household session demographic data 1310 can result in valuable session demographic data, even if such data is not added to the average demographic characterization of the household.

FIG. 15 illustrates the average and session household demographic characteristics. A household demographic parameters column 1501 is followed by an average value column 1505, a session value column 1503, and an update column 1507. The average value column 1505 and the session value column 1503 are derived from the household demographic characterization process 1400. The deterministic parameters such as address and telephone numbers can be obtained from an outside source or can be loaded into the system by the subscriber or a network operator at the time of installation. Updating of deterministic values is prevented by indicating that these values should not be updated in the update column 1507.

Figure 16:
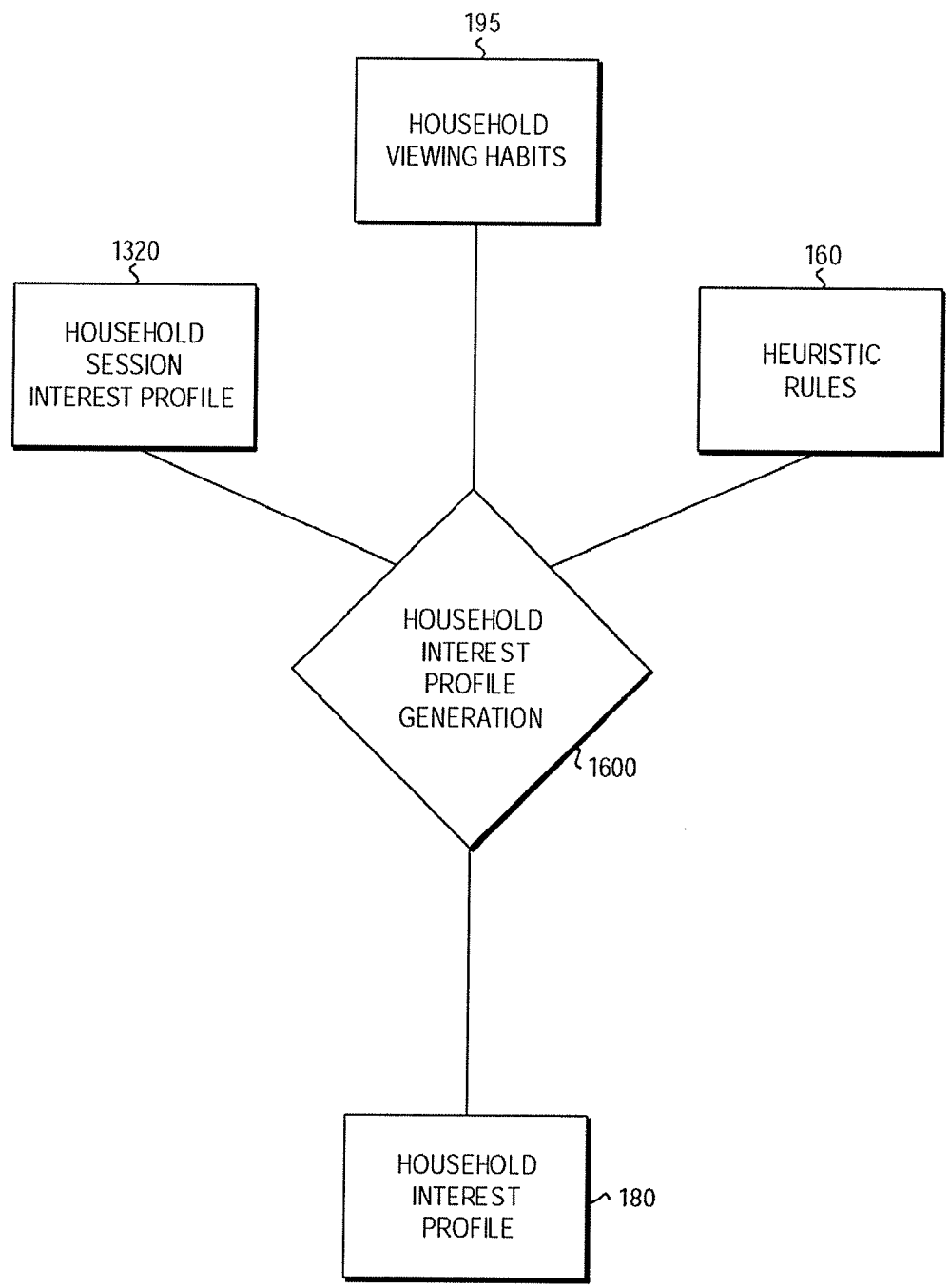
FIG. 16 illustrates an entity-relationship diagram for generation of a household interest profile.

FIG. 16 illustrates an entity-relationship diagram for the generation of the household interest profile 180 in a household interest profile generation process 1600. In a preferred embodiment, the household interest profile generation process comprises averaging the household session interest profile 1320 over multiple sessions and applying the household viewing habits 195 in combination with the heuristic rules 160 to form the household interest profile 180 which takes into account both the viewing preferences of the household as well as assumptions about households/subscribers with those viewing habits and program preferences.

FIG. 17 illustrates the household interest profile 180 which is composed of a programming types row 1709, a products types row 1707, and a household interests column 1701, an average value column 1703, and a session value column 1705.

The product types row 1707 gives an indication as to what type of advertisement the household would be interested in watching, thus indicating what types of products could potentially be advertised with a high probability of the advertisement being watched in its entirety. The programming types row 1709 suggests what kind of programming the household is likely to be interested in watching. The household interests column 1701 specifies the types of programming and products which are statistically characterized for that household.

As an example of the industrial applicability of the invention, a household will perforin its normal viewing routine without being requested to answer specific questions regarding likes and dislikes. Children may watch television in the morning in the household, and may change channels during commercials, or not at all. The television may remain off during the working day, while the children are at school and day care, and be turned on again in the evening, at which time the parents may "surf" channels, mute the television during commercials, and ultimately watch one or two hours of broadcast programming. The present invention provides the ability to characterize the household, and may make the determination that there are children and adults in the household, with program and product interests indicated in the household interest profile 180 corresponding to a family of that composition. A household with two retired adults will have a completely different characterization which will be indicated in the household interest profile 180.

Figure 18:
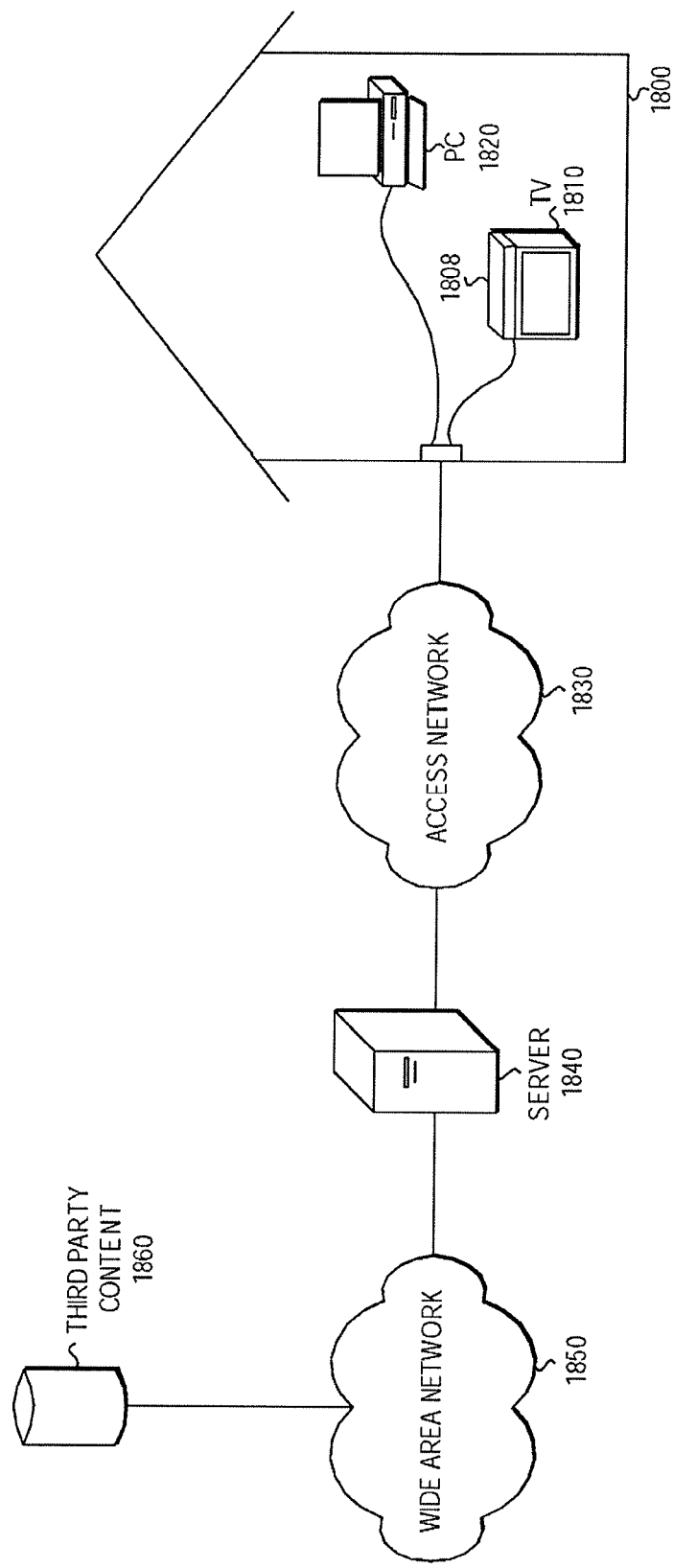
FIG. 18 illustrates a client-server architecture for realizing the present invention.

Although the present invention has been largely described in the context of a single computing platform receiving programming, the SCS 100 can be realized as part of a client-server architecture, as illustrated in FIG. 18. Referring to FIG. 18, residence 1800 contains a personal computer (PC) 1820 as well as the combination of a television 1810 and a set-top 1808, which can request and receive programming. The equipment in residence 1800, or similar equipment in a small or large business environment, forms the client side of the network as defined herein. Programming is delivered over an access network 1830, which may be a cable television network, telephone type network, or other access network. Information requests are made by the client side to a server 1840 which forms the server side of the network. Server 1840 has content locally which it provides to the subscriber, or requests content on behalf of the subscriber from a third party content provider 1860, as illustrated in FIG. 18. Requests made on behalf of the client side by server 1840 are made across a wide area network 1850 which can be the Internet or other public or private network. Techniques for making requests on behalf of a client are frequently referred to a proxy techniques and are well known to those skilled in the art. The server side receives the requested programming which is displayed on PC 1820 or television 1810 according to which device made the request.

In a preferred embodiment the server 1840 maintains the subscriber selection data 110 which it is able to compile based on its operation as a proxy for the client side. Retrieval of source related information and the program target analysis process 1100, the program characterization process 800, the program target analysis process 1100, the session characterization process 1300, the household demographic characterization process 1400, and the household interest profile generation process 1600 can be performed by server 1840.

Referring to FIG. 19 an advertisement monitoring table is illustrated, in which an advertisement ID (AD ID) column 1915 contains a numerical ID for an advertisement which was transmitted with the advertisement in the form of a Program ID, http address, or other identifier which is uniquely associated with the advertisement. A product column 1921 contains a product description which indicates the type of product that was advertised. A brand column 1927 indicates the brand name of the product or can alternatively list a generic name for that product. A percent watched column 1933 indicates the percentage of the advertisement the subscriber viewed. In an alternate embodiment, a letter rating or other type of rating is used to indicate the probability that the advertisement was watched. A volume column 1937 indicates the volume level at which the advertisement was watched.

As an example of the industrial applicability of the invention, a manufacturer may develop an advertising strategy includes the insertion of advertisements during popular evening programs. The costs for such ad insertions can be extremely high. In order to insure the cost effectiveness of this advertising strategy, the manufacturer has the advertisements placed during less watched but similar programs and monitors how subscribers react, and can determine approximately how many times the advertisement has been watched out of all of the possible viewings. This data can be used to confirm the potential effectiveness of the advertisement and to subsequently determine if purchasing the more expensive time during evening programming will be cost-effective, or if the advertisement should be modified or placed in other programming.

Continuing this example, the manufacturer may place an advertisement for viewing during "prime time" for an initial period but can subsequently cancel broadcasts of the advertisement if it is found that the majority of subscribers never see the advertisement.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer-implemented method of collecting information about a consumer based on a video program presented to the consumer, the method comprising:
    (a) identifying metadata embedded with the video program;
    (b) retrieving at least one keyword and a probabilistic measure of gender associated with the at least one keyword;
    (c) evaluating the metadata for the at least one keyword; and
    (d) inferring the gender of the consumer based on the probabilistic measure of gender associated with the at least one keyword and the evaluating the metadata.

2. The method of claim 1, wherein the metadata includes a program content descriptor of the video program being presented to the consumer.

3. The method of claim 1, wherein the probabilistic measure of gender is associated with the at least one keyword via the application of one or more pre-defined heuristic rules.

4. The method of claim 1, wherein the metadata includes a plurality of embedded descriptive fields that identify characteristics of the video program.

5. The method of claim 4, wherein evaluating the metadata includes comparing at least one of the embedded descriptive fields to the at least one keyword.

6. The method of claim 1, further comprising:
    (e) aggregating the identified metadata with previously retrieved metadata;
    (f) inferring at least one consumer demographic characteristic based on the aggregated metadata; and
    (g) displaying advertisements to the consumer based on the at least one demographic characteristic.

7. The method of claim 1, wherein the evaluating the metadata includes comparing the at least one keyword to words in the metadata.

8. The method of claim 1, wherein the evaluating the metadata includes comparing synonyms of the at least one keyword to words in the metadata.

9. The method of claim 1, further comprising:
    (e) selecting an advertisement for presentation to the consumer based at least in part on the inferred gender.

10. A computer program product, comprising a computer usable medium having a computer readable program code embodied therein, said computer readable program code adapted to be executed to implement a method of collecting information about a subscriber based on the subscriber's interaction with programming in an Internet video system, the method comprising:
    (a) retrieving embedded metadata associated with the programming viewed by the subscriber;
    (b) retrieving a plurality of keywords and a probabilistic measures of gender associated with each of the keywords;
    (c) identifying an instance of at least one of the keywords in the metadata;
    (d) calculating the probability of the subscriber being a gender based on the identified instance of keywords in the metadata and the probabilistic measure of gender associated with the keyword; and
    (e) associating the subscriber with the gender based on the probability.

11. The computer program product of claim 10, wherein the calculating is accomplished by utilizing Bayes Rule.

12. The computer program product of claim 10, wherein the calculating includes forming a weighted average of the gender based on the probabilistic measure of gender associated with each identified instance of a keyword.

13. The method of claim 10, wherein the metadata includes a program content descriptor of the video program being presented to the consumer.

14. The method of claim 10, wherein the probabilistic measure of gender is associated with each of the keywords via the application of one or more pre-defined heuristic rules.

15. The method of claim 10, further comprising:
    (f) displaying advertisements to the subscriber based on the gender associated with the subscriber.

16. A user profiling system for selecting an advertisement in a multimedia environment, said system comprising:
    a processor configured with a plurality of software modules, the modules including,
    an identification module configured to receive metadata embedded with a video program being presented to the consumer in the multimedia environment;
    a profiling module configured to retrieve at least one keyword and a probabilistic measure of gender associated with the at least one keyword, evaluate the metadata for the at least one keyword and infer a gender of the consumer based on the probabilistic measure of gender; and
    an advertisement selection module configured to select an advertisement for presentation to the consumer based at least in part on the inferred gender.

17. The system of claim 16, wherein the probabilistic measure of gender is associated with the at least one keyword via the application of one or more pre-defined heuristic rules.

18. The system of claim 16, wherein the profiling module is further configured to aggregate the metadata with previously stored metadata and to infer at least one consumer demographic characteristic based on the aggregated metadata.

19. The system of claim 18, wherein the advertising selection module is further configured to display advertisements at least in part on the consumer demographic characteristic.

20. The system of claim 16, wherein the profiling module evaluates the metadata by comparing synonyms of the at least one keyword to words in the metadata.

* * * * *